(12) United States Patent
Fan

(10) Patent No.: US 10,924,572 B2
(45) Date of Patent: Feb. 16, 2021

(54) INFORMATION PUSH METHOD AND APPARATUS, INFORMATION SENDING METHOD AND APPARATUS, SYSTEM, AND STORAGE MEDIUM

(71) Applicant: TENCENT TECHNOLOGY (SHENZHEN) COMPANY LIMITED, Shenzhen (CN)

(72) Inventor: Lin Fan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 32 days.

(21) Appl. No.: 16/447,477

(22) Filed: Jun. 20, 2019

(65) Prior Publication Data

US 2019/0306262 A1 Oct. 3, 2019

Related U.S. Application Data

(63) Continuation of application No. PCT/CN2018/082427, filed on Apr. 10, 2018.

(30) Foreign Application Priority Data

Apr. 13, 2017 (CN) .......................... 2017 1 0240834

(51) Int. Cl.
*G06F 15/16* (2006.01)
*H04L 29/08* (2006.01)
(Continued)

(52) U.S. Cl.
CPC .............. *H04L 67/26* (2013.01); *G06F 16/00* (2019.01); *G06F 16/24575* (2019.01); *H04L 29/08* (2013.01); *H04L 67/22* (2013.01)

(58) Field of Classification Search
CPC ......... H04L 67/26; H04L 29/08; H04L 67/22; G06F 16/24575; G06F 16/00
(Continued)

(56) References Cited

U.S. PATENT DOCUMENTS 7,124,172 B1* 10/2006 Hirayama ........... H04L 63/0414
709/217
2008/0189331 A1* 8/2008 Lee ........................ G06Q 10/10
(Continued)

FOREIGN PATENT DOCUMENTS

CN 104965822 A 10/2015
CN 105929964 A 9/2016
(Continued)

OTHER PUBLICATIONS

The World Intellectual Property Organization (WIPO) International Search Report for PCT/CN2018/082427 dated Jul. 13, 2018 6 Pages (including translation).

*Primary Examiner* — Anthony Mejia
(74) *Attorney, Agent, or Firm* — Anova Law Group, PLLC

(57) ABSTRACT

An information push method and apparatus, and an information sending method and apparatus are provided. The information push method includes: obtaining text information sent by a terminal, and obtaining input process information corresponding to the text information. The input
(Continued)

process information includes at least one of: response duration, input duration and focus switch operation information associated with a process that a user of the terminal enters the text information. The method also includes obtaining first user emotion information corresponding to the input process information. The first user emotion information characterizes an emotion state in the process of inputting the text information by the user. The method also includes generating push information according to the text information and the first user emotion information, and sending the push information to the terminal.

20 Claims, 11 Drawing Sheets

(51) Int. Cl.
  *G06F 16/2457* (2019.01)
  *G06F 16/00* (2019.01)
(58) Field of Classification Search
  USPC ........................................................ 709/206
  See application file for complete search history.

(56) References Cited

U.S. PATENT DOCUMENTS

| | | | |
|---|---|---|---|
| 2010/0235451 A1* | 9/2010 | Yu | H04L 51/04 709/206 |
| 2013/0283303 A1* | 10/2013 | Moon | G06Q 30/0631 725/10 |
| 2014/0067818 A1* | 3/2014 | Bao | G06F 16/9535 707/740 |
| 2015/0319121 A1* | 11/2015 | Iyer | H04L 51/20 709/204 |
| 2016/0165038 A1* | 6/2016 | Lim | H04M 1/72569 715/728 |
| 2016/0210116 A1 | 7/2016 | Kim et al. | |
| 2018/0357286 A1* | 12/2018 | Wang | G06K 9/6267 |
| 2019/0073547 A1* | 3/2019 | el Kaliouby | G06K 9/00302 |
| 2019/0098099 A1* | 3/2019 | Goslin | A61B 5/1118 |
| 2019/0116473 A1* | 4/2019 | Constantinides | H04L 51/10 |
| 2019/0155840 A1* | 5/2019 | O'Konski | G06F 16/636 |

FOREIGN PATENT DOCUMENTS

| | | |
|---|---|---|
| CN | 106294326 A | 1/2017 |
| CN | 106383815 A | 2/2017 |

* cited by examiner

_US 10,924,572 B2_

INFORMATION PUSH METHOD AND APPARATUS, INFORMATION SENDING METHOD AND APPARATUS, SYSTEM, AND STORAGE MEDIUM

CROSS-REFERENCES TO RELATED APPLICATIONS

This application is a continuation application of PCT Patent Application No. PCT/CN2018/082427, filed on Apr. 10, 2018, which claims priority to Chinese Patent Application No. 201710240834.3, entitled "INFORMATION PUSH METHOD FOR A SERVER, INFORMATION SENDING METHOD AND APPARATUS FOR A TERMINAL, AND A SYSTEM" and filed with the China National Intellectual Property Administration on Apr. 13, 2017, the entire contents of both of which are incorporated herein by reference.

FIELD OF THE TECHNOLOGY

Embodiments of this application relate to the field of communications technologies, and in particular, to an information push method and apparatus, an information sending method and apparatus, a system, and a storage medium.

BACKGROUND OF THE DISCLOSURE

With continuous popularization and development of terminals, functions provided by the terminals are also increasing, and users also increasingly depend on various functions provided by the terminals in daily life. Using a search function as an example, currently, when a user needs to obtain some information, the user needs to input corresponding text information in a text box in an application interface of a terminal, and then select a sending instruction (e.g., click a sending button). The terminal sends the text information to a server, the server matches corresponding push information according to the text content, and sends the matched push information to the terminal, and the terminal displays the push information to the user.

SUMMARY

An embodiment of this application provides an information push method. The method includes: obtaining text information sent by a terminal, and obtaining input process information corresponding to the text information. The input process information includes at least one of: response duration, input duration and focus switch operation information associated with a process that a user of the terminal enters the text information. The method also includes obtaining first user emotion information corresponding to the input process information. The first user emotion information characterizes an emotion state in the process of inputting the text information by the user. The method also includes generating push information according to the text information and the first user emotion information, and sending the push information to the terminal.

An embodiment of this application further provides an information push apparatus, including: a memory and a processor, the memory storing computer readable instructions, and the processor executing the computer readable instructions stored in the memory to perform: obtaining text information sent by a terminal, and obtaining input process information corresponding to the text information. The input process information includes at least one of: response duration, input duration and focus switch operation information associated with a process that a user of the terminal enters the text information. The processor also executes the computer readable instructions to perform: obtaining first user emotion information corresponding to the input process information. The first user emotion information characterizes an emotion state in the process of inputting the text information by the user. The processor also executes the computer readable instructions to perform: generating push information according to the text information and the first user emotion information, and sending the push information to the terminal.

An embodiment of this application further provides a non-transitory computer readable storage medium, storing computer readable instructions that, when being executed by at least one processor, cause the at least one processor to perform: obtaining text information sent by a terminal, and obtaining input process information corresponding to the text information. The input process information includes at least one of: response duration, input duration and focus switch operation information associated with a process that a user of the terminal enters the text information. The computer readable instructions also cause the at least one processor to perform: obtaining first user emotion information corresponding to the input process information. The first user emotion information characterizes an emotion state in the process of inputting the text information by the user. The computer readable instructions also cause the at least one processor to perform: generating push information according to the text information and the first user emotion information, and sending the push information to the terminal.

BRIEF DESCRIPTION OF THE DRAWINGS

The following describes specific implementations of embodiments of this application in detail with reference to the accompanying drawings, to make the technical solutions and other beneficial effects of the embodiments of this application be obvious.

DESCRIPTION OF EMBODIMENTS

Figure 1A:
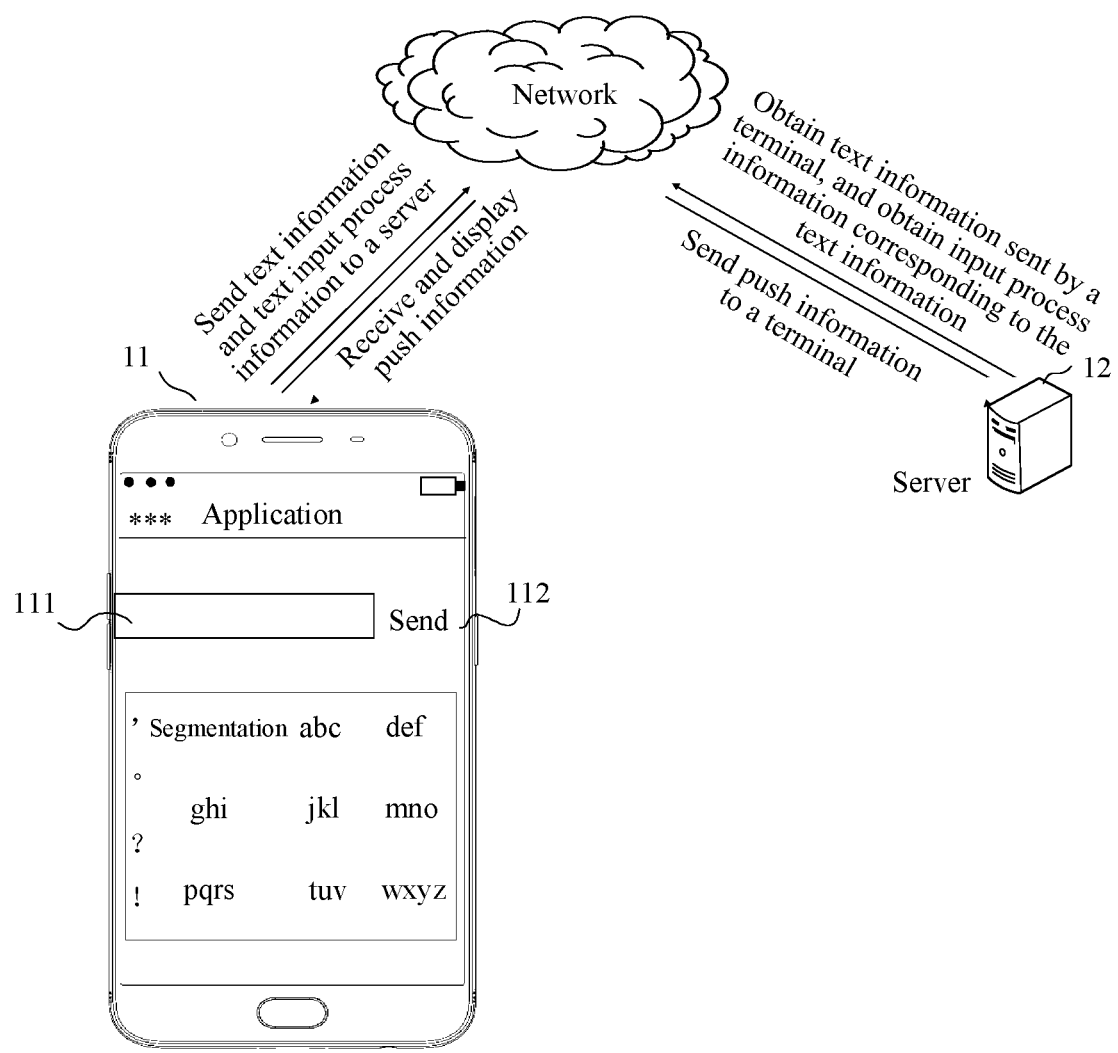
FIG. 1a is a schematic structural diagram of an information push system according to an embodiment of this application.

Referring to the drawings, same components are represented by same component symbols. The principle of the embodiments of this application is illustrated by an implementation in a suitable computing environment. The following description is based on the illustrated specific embodiment of this application, which should not be construed as limiting other specific embodiments of this application not discussed in detail herein.

A term "module" used in the specification may be regarded as a software object executed in a computing system. Different components, modules, engines, and services described in the specification may be regarded as objects implemented in the computing system. The apparatus and the method in this specification are preferably implemented in a software manner, and certainly may also be implemented in hardware, both of which fall within the protection scope of the embodiments of this application.

Referring to FIG. 1a, FIG. 1a is a schematic structural diagram of an information push system according to an embodiment of this application. The information push system includes an information sending apparatus and an information push apparatus. The information sending apparatus may be specifically integrated in a terminal 11 or any other suitable computing device. The terminal 11 is, for example, a mobile phone or a tablet computer. The information push apparatus may be integrated in a server 12 or any other suitable computing device. In some other embodiments, the information sending apparatus and the information push apparatus may be integrated in a same computing device.

In a specific implementation process, after opening an application of the terminal 11, a user may input text information in a text input box 111 in an application interface of the terminal 11 (e.g., a graphical user interface of an application executed by the terminal 11), and after obtaining the text information input by the user, the terminal 11 sends the text information to the server 12 through a network.

The server 12 receives the text information sent by the terminal 11, and obtains input process information corresponding to the text information at the same time. In some embodiments of this application, the server 12 obtains the corresponding input process information in two manners:

One is passively receiving the input process information sent by the terminal 11. That is, the terminal 11 obtains the input process information, and sends the obtained input process information to the server 12, and the server 12 receives the input process information.

The other is that the server 12 actively generates the input process information. In some embodiments, the terminal 11 monitors terminal application page state information in a process of inputting text information by a user, and sends the text information and the terminal application page state information to the server 12, and the server 12 generates the input process information according to the terminal application page state information.

After obtaining the text information and the input process information corresponding to the text information, the server 12 continues to obtain user emotion information corresponding to the input process information, then generates push information according to the obtained user emotion information and the received text information, and sends the push information to the terminal 11.

The terminal 11 receives the push information, and displays the received push information to the user.

As can be learned from the foregoing, in some embodiments of this application, during obtaining of the text information, the input process information corresponding to the text information is further obtained, and the user emotion information is matched according to the input process information. Then, the push information is generated according to the user emotion information and the text information. Obviously, because the push information is associated with the user emotion information, the push information wanted by the user may be generated more accurately, thereby improving accuracy of the push information.

Figure 1B:
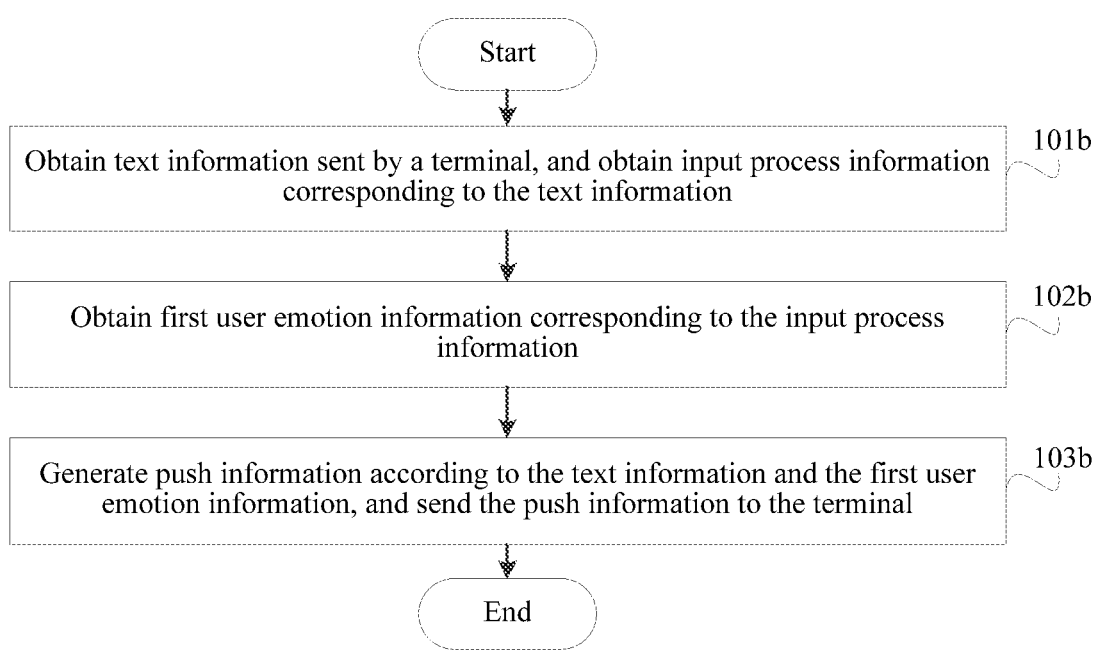
FIG. 1b is a flowchart of a server information sending method according to an embodiment of this application.

FIG. 1b is a flowchart of a server information sending method according to an embodiment of this application. The method is performed by a server. As shown in FIG. 1, the method includes the following steps.

Step 101b: Obtain text information sent by a terminal, and obtain input process information corresponding to the text information, the input process information including at least one of the following: response duration, input duration, and focus switch operation information. In other words, the input process information are information associated with a process that a user of the terminal enters/inputs the text information.

In some embodiments, the text information is input in a text input box in an application interface of the terminal (e.g., an interface of a terminal application) by the user, and is sent to the server upon detection of a sending instruction being selected (e.g. clicking a sending button). The response duration is duration from a moment at which an interface of the terminal application is entered (e.g., a moment when a graphical user interface of the terminal application is activated based on user operation) to a moment at which the text input box is selected (e.g., a current focus being at the text input box based on a user operation such as clicking or touching the text input box); the input duration is a duration from a moment at which the user selects the text input box to a moment at which the sending instruction is selected (e.g., a sending button is clicked); and the focus switch operation information includes at least one of a quantity of times of focus switches, a focus switch type, and a focus switch time interval. The focus may be a current cursor focus.

In some embodiments, the quantity of times of focus switches is a quantity of times that the text input box loses focus; the focus switch type includes at least one of: performing a switch operation between a plurality of interfaces of a terminal application (e.g., the terminal application that presents the text input box), performing a switch operation between a plurality of different terminal applications, running the terminal application at background, and selecting push content in an interface of the terminal application (e.g., a same interface that presents the text input box or a different graphical interface of the same application that presents the text input box); and the focus switch time interval is a time interval between two consecutive focus switch operations.

Step 102b: Obtain first user emotion information corresponding to the input process information, the first user emotion information being used for characterizing an emotion state in a process of inputting the text information by a user. Herein, the first user emotion information may also be referred to as user emotion information.

Step 103b: Generate push information according to the text information and the first user emotion information, and send the push information to the terminal.

In some embodiments of this application, during obtaining of the text information, the input process information corresponding to the text information is further obtained, and the user emotion information is matched according to the input process information. Then, the push information is generated according to the user emotion information and the text information. Obviously, because the push information is associated with the user emotion information, the push information wanted by a user may be generated more accurately, thereby improving accuracy of the push information. Therefore, a quantity of times of data interactions between the server and the terminal can be reduced, to avoid occupying more resources of the server, and further reduce running burden of the server.

Figure 2:
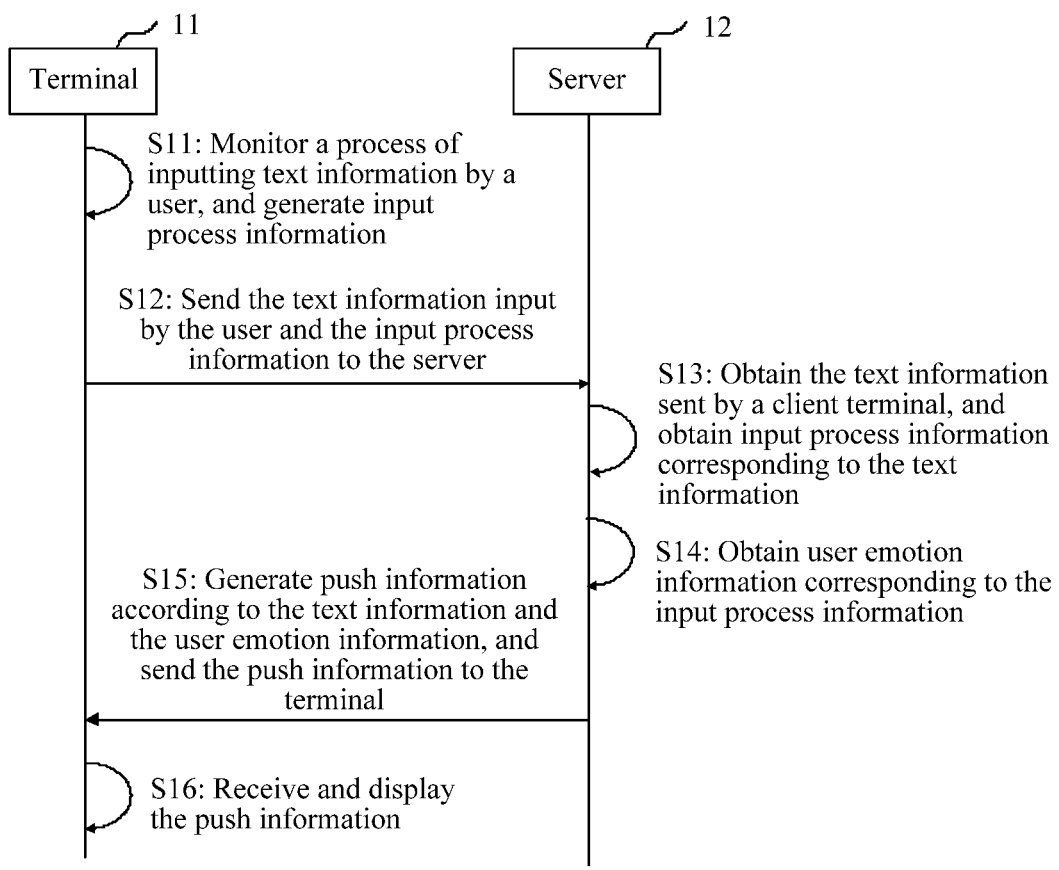
FIG. 2 is a schematic diagram of an interaction between a terminal and a server according to an embodiment of this application.

The information push method for a server and the information sending method for a terminal provided in the embodiments of this application are described in detail below with reference to the accompanying drawings. In some embodiments of this application, the input process information is sent to the server 12 after generated by the terminal 11. Referring to FIG. 2, FIG. 2 is a schematic diagram of a signaling interaction between the terminal 11 and the server 12 according to an embodiment of this application.

S11: The terminal 11 monitors a process of inputting text information by a user, and generates input process information.

In some embodiments, the process of inputting the text information by the user is a process from the user entering an application interface of the terminal to clicking a sending button 112. Certainly, the process of inputting the text information by the user may also be another process. For example, the process of inputting the text information by the user may be a process from starting to input the text information by clicking a text input box 111 to clicking the sending button 112, which is not specifically limited herein.

After the user enters the application interface of the terminal 11, the terminal 11 monitors the process of inputting the text information by the user, and generates the input process information according to the process of inputting the text information, which specifically includes the following steps:

a. Monitor first duration consumed from entering the application interface of the terminal 11 to clicking the text input box 111 by the user, and generate response duration according to the first duration.

b. Monitor second duration consumed from clicking the text input box 111 by the user to clicking the sending button 112, and generate input duration according to the second duration.

c. Monitor focus switch operation information that the text input box 111 loses focus. The focus switch operation information may include one or any combination of following information types:

c1: A quantity of times of focus switches. The quantity of times of focus switches is a quantity of times that the text input box 111 loses focus. For example, in the process of inputting the text information by the user, switch operations are further performed between a plurality of interfaces in the terminal application, historical push information in the terminal application is clicked and viewed, and the like, so that the text input box 111 loses focus. In this case, the quantity of times of focus switches is a nonzero value. If the user keeps inputting text information, that is, the text input box 111 does not lose focus, in this case, the quantity of times of focus switches is 0.

c2: A focus switch type. The focus switch type may include one or more of the following: performing switch operations between a plurality of interfaces in the terminal application; running the terminal application at background; clicking other historical push content in an interface of the terminal application; and the like.

c3: A focus switch time interval: If a focus switch operation exists, a time interval between two consecutive focus switch operations is recorded.

It may be understood that, the focus switch operation information may further include other information not listed, which is not specifically limited herein.

It should be noted that, in some embodiments, the input process information includes response duration, input duration, and focus switch operation information, while in some other embodiments, the input process information may further be any one of or a combination of any two of the foregoing three types, or certainly may include other information not listed, which is not specifically limited herein.

It may be understood that, in addition to monitoring the process of inputting the text information by the user, the terminal 11 further obtains the text information input by the user.

S12: The terminal 11 sends the text information input by the user and the input process information to the server 12.

In a specific implementation process, after the user inputs the text information and clicks the sending button 112, the terminal 11 sends the text information and the input process information to the server 12.

After obtaining the text information and the input process information, the terminal 11 further performs an aggregation operation on the text information and the input process information, for example, combines the text information and the input process information into one file, and then, sends aggregated information to the server 12. Certainly, the terminal 11 may also send the text information and the input process information sequentially to the server 12. The manner for sending the text information and the input process information is not limited herein.

S13: The server 12 receives the text information and input process information corresponding to the text information sent by the terminal 11.

The input process information sent by the terminal 11 and received by the server 12 includes the response duration, the input duration, and the focus switch operation information listed in step S11.

S14: The server 12 obtains user emotion information corresponding to the input process information.

In some embodiments, the server pre-stores correspondences between multiple input process information and multiple user emotion information (e.g., each user emotion information being corresponded to a different preset requirement for input process information, such as requirement(s) related to the response time, the input duration, and/or the focus switch operation information), and then obtains the user emotion information corresponding to the input process information from the pre-stored correspondences (e.g., when the current input process information satisfies one of the preset requirements, the user emotion information corresponding to the satisfied preset requirements is obtained).

Specifically, the server first determines whether corresponding user emotion information exists in the correspondence, obtains user emotion information corresponding to the input process information if the corresponding user emotion information exists in the correspondence; send emotion query information (e.g., querying the user to select from multiple emotion states) to the terminal 11 if the corresponding user emotion information does not exist in the correspondence (e.g., the current input process information does not satisfy any of the preset requirements), and receives current emotion information sent by the terminal 11 according to the emotion query information, where the current emotion information is input by the user based on the emotion query information.

In some embodiments, the foregoing correspondence may be that the emotion state represented by the first user emotion information is determined as a first emotion state if a sum of the response duration and the input duration is greater than or equal to a first preset value, and it is determined according to the focus switch operation information that a focus switch operation exists (i.e., the focus switch operation information indicates that a focus switch operation exists); or the emotion state represented by the first user emotion information is determined as a second emotion state if a sum of the response duration and the input duration is less than a second preset value, and it is determined according to the focus switch operation information that no focus switch operation exists (i.e., the focus switch operation information indicates that no focus switch operation exists).

To better understand the correspondence, and how to obtain user emotion information according to the correspondence, an example is provided below for explanation and description. The correspondence is shown in Table 1.

TABLE 1

| | Correspondence |
|---|---|
| User emotion information | Correspondence |
| Hesitating emotion | A sum of response duration and input duration is three times greater than a preset value, and a focus switch operation exists |
| Happy emotion | A sum of response duration and input duration is less than a preset value, and no focus switch operation exists |

As shown in Table 1, in the correspondence, two types of user emotion information, that is, a hesitating emotion or an uncertain emotion (e.g., the first emotion state) and a happy emotion or an affirmative/decisive emotion (e.g., the second emotion state), exist. If a user is in the hesitating emotion when inputting text information, the user may browse much historical push information before inputting the text information, or repeatedly perform write and delete operations in the text input box 111, causing relatively long response duration and input duration. Alternatively, the user is hesitated in the process of inputting the text information, and returns to view the historical push information for a plurality of times. In this case, the text input box loses focus, that is, a focus switch operation exists. Therefore, "A sum of response duration and input duration is three times greater than a preset value, and a focus switch operation exists three times greater than" may be used to describe the hesitating emotion.

If a user is in a happy emotion when inputting text information, the user may relatively decisively input content wanted by the user. In this case, the response duration and the input duration are relatively short, and the focus switch operation may not exist. Therefore, "A sum of response duration and input duration is less than a preset value, and no focus switch operation exists" may be used to describe the happy emotion.

It may be understood that, the user emotion information is not limited to the two types shown in Table 1, and may include more types of emotions, which will not be listed one by one herein. In addition, the correspondence between the user emotion information and the input process information is also not limited to the situation in Table 1. The correspondence shown in Table 1 only has an exemplary illustrative effect. In an actual application process, the correspondence may be set according to an actual requirement.

The process of obtaining the user emotion information by the server 12 according to the correspondence is described below with reference to Table 1.

The server 12 determines whether the input process information matches the hesitating emotion.

For example, the server 12 determines whether a sum of the response duration and the input duration in the input process information is three times greater than the preset value, and if the sum of the response duration and the input duration three times greater than the preset value, then determines whether a focus switch operation exists according to the focus switch operation information in the input process information. For example, the server determines whether a quantity of times of focus switch operations in the focus switch operation information is zero, and if the quantity of times of the focus switch operations is not zero, determines that the focus switch operation exists. In this case, the server 12 determines that the currently obtained input process information matches the hesitating emotion in the correspondence, to obtain user emotion information corresponding to the input process information as a hesitating emotion.

If determining that the input process information does not match the hesitating emotion, the server 12 continues to determine whether the input process information matches the happy emotion. The specific determining method is similar to that in the foregoing situation and will not be repeated herein.

It may be understood that, the method for obtaining the user emotion information by the server 12 according to the correspondence is only one of many methods, and any method can be used provided that the server 12 may obtain the corresponding user emotion information according to the correspondence.

If the server 12 determines that the input process information matches no user emotion information in the correspondence, that is, no user emotion information corresponding to the input process information exists in the correspondence, the server 12 sends emotion query information to the terminal 11. After receiving the emotion query information, the terminal 11 obtains, according to the emotion query information, current emotion information input by the user.

In some embodiments, the emotion query information may appear in a form of a questionnaire survey. The emotion query information includes a plurality of emotion options, and the user only needs to select one option appropriate for a current emotion state, to finish the operation of inputting current emotion information. The terminal 11 obtains the current emotion information selected by the user. For example, the user selects an angry emotion from a plurality of emotion options as the current emotion information, so that the terminal 11 obtains the current emotion information input by the user as the angry emotion.

In some embodiments, the emotion query information may appear in a query form, such as: "How do you feel now?", and other similar sentences. The user inputs the current emotion information in the corresponding text input box 111 according to the emotion query information, for example, inputs "hesitating" and "happy" in the corresponding text input box 111, so that the terminal 11 obtains the current emotion information input by the user.

It may be understood that, the manner for querying the current emotion information of the user is not limited to the foregoing questionnaire survey and questioning and query manners, and may further be another form, which is not specifically limited herein.

After obtaining the current emotion information input by the user, the terminal 11 sends the current emotion information to the server 12. The server 12 receives the current emotion information of the user sent by the terminal 11 according to the emotion query information, where the current emotion information is user emotion information corresponding to the input process information.

S15: The server 12 generates push information according to the text information and the user emotion information, and sends the push information to the terminal 11.

After obtaining the text information, the server 12 performs semantic identification on the text information, to obtain an intention of the user, for example, identify that the user wants to watch a movie, the user wants to travel, or other intentions. Then, the server 12 generates push information based on a preset processing rule according to the text information and the user emotion information obtained in the correspondence, or according to the text information and the current emotion information received from the terminal 11. For example, when the user is decisive about a certain movie, the user input process information may indicate that the input duration and/or the response duration is relatively small, the user emotion information correspondingly obtained based on the user input process information (e.g., the pre-stored correspondences and/or rule) may indicate the first emotion state, the server may then directly push information about the user-requested movie alone. On the other hand, when the user is not sure which movie to watch, the user input process information may indicate that the input duration and/or the response duration is relatively great, the user emotion information correspondingly obtained based on the user input process information (e.g., the pre-stored correspondences and/or rule) may indicate the second emotion state, the server may then push information with more guidance and introductory materials about the movie (e.g., casts, news and backgrounds) and some other similar movies (e.g., in a same genre).

In some embodiments, the preset processing rule may be a rule related to the user emotion information and the text information. For example, if the obtained user emotion information is a hesitating emotion, and the text information is "I want to watch a movie", the preset processing rule may be set to push content corresponding to the text information and other content, for example, push several movies and several entertainment programs having relatively high network scores. In this way, the user may perform a free selection in the movies and entertainment programs.

In some embodiments, when the text information carries second emotion information, the push information is generated based on a preset processing rule according to the text information, the first user emotion information, the second user emotion information, where in the preset processing rule, a weight value of the second user emotion information is set to be greater than a weight value of the first user emotion information. Herein, the second user emotion information is carried in a text and used for characterizing an emotion state in the process of inputting the text information by the user.

For example, when the text information carries emotion type information, for example, the text information is "I am unhappy and want to watch a movie", in this case, the server 12 may identify that the user emotion is "unhappy" and the intention of the user is "want to watch a movie". In this case, in the preset processing rule, a weight value of a user emotion corresponding to the text information is set to be greater than a weight value of the user emotion information corresponding to the input process information, so that push information more appropriate for the user emotion may be obtained.

Certainly, the preset processing rule may not only be related to the user emotion information and the text information, but also be related to information such as hobbies and experiments of the user. For example, if the user usually likes to watch funny entertainment programs, the preset processing rule may be set to push comedy content corresponding to the text information and other comedy content, for example, push a comedy movie, a plurality of funny entertainment programs, and the like with relatively high network scores.

It may be understood that, the preset processing rule may be set according to an actual requirement. Specific content of the preset processing rule is not limited herein. Meanwhile, to push information to the user more accurately, the preset processing rule may be updated continuously, to adapt to changes of society and times, so that the push information better adapts to the user requirement.

Figure 3:
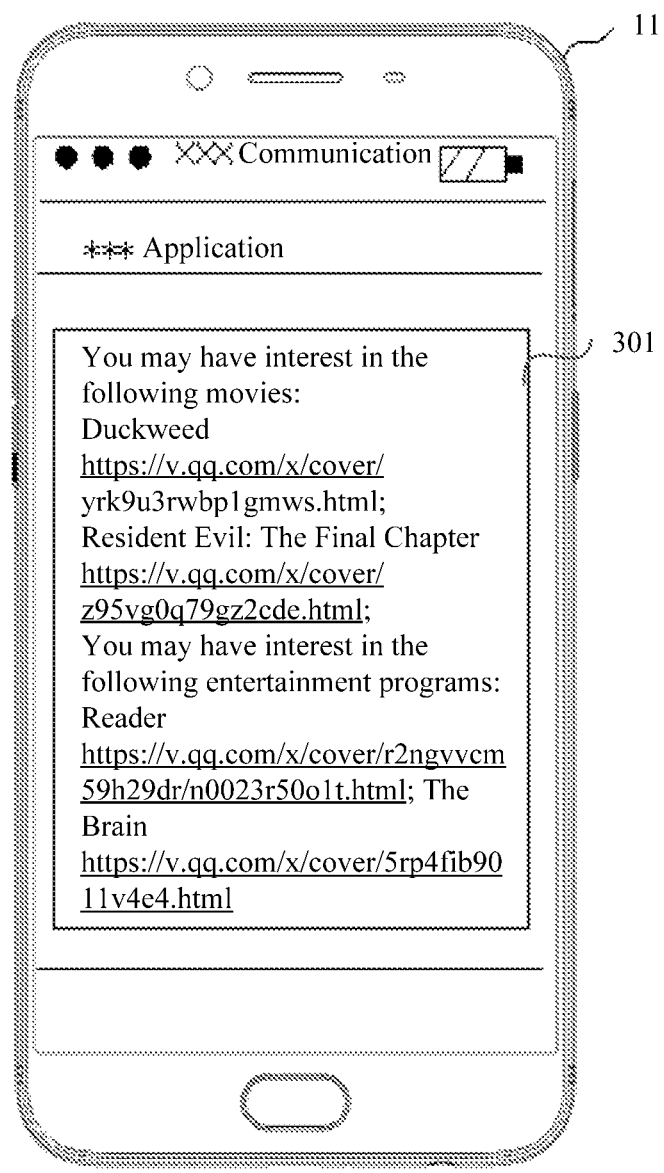
FIG. 3 is a schematic scenario diagram of push information in FIG. 2.

In some embodiments, the push information may include word information and a corresponding watching link. For example, as shown in FIG. 3, an application is installed in the terminal 11, and after receiving push information 301, the terminal 11 displays the push information 301 on a screen. In FIG. 3, the push information 301 includes pushed movie names, entertainment program names, and corresponding watching links.

Certainly, in other embodiments, the push information may not include the corresponding watching links. In this case, the user may copy the recommended movie name and entertainment program name to a corresponding player to watch. In addition, the push information may further include information such as a corresponding picture. For example, during recommendation of a movie, a promotion picture and the like of the movie may be attached. The push information is not specifically limited herein.

In some embodiments, when generating the push information according to the current emotion information and the text information, the server 12 further needs to store the current emotion information and the input process information to the correspondence, to perfect the correspondence. Certainly, the server 12 may not store the current emotion information and the input process information to the correspondence, which is not specifically limited herein.

S16: The terminal 11 receives and displays the push information.

After receiving the push information fed back by the server 12, the terminal 11 displays the push information, so that the user may browse the push information.

In some embodiments, the terminal 11 monitors a process of inputting text information by a user and generates input process information, and then sends the text information and the input process information to the server 12. The server 12 obtains user emotion information corresponding to the input process information, generates push information according to the user emotion information and the text information, and feeds back the push information to the terminal 11. The terminal 11 displays the push information to the user. In the method, the process of inputting the text information by the user is detected and the user emotion information is obtained according to the input process information, then, more appropriate push information is provided to the user according to the user emotion information and the text information, so that a quantity of times of data interactions between the terminal 11 and the server 12 may be reduced, to avoid occupying more resources of the server 12, thereby reducing running burden of the server 12.

In some embodiments of this application, the input process information may also be generated by the server 12. The terminal 11 mainly sends terminal application page state information required for generating the input process information to the server 12.

Figure 4:
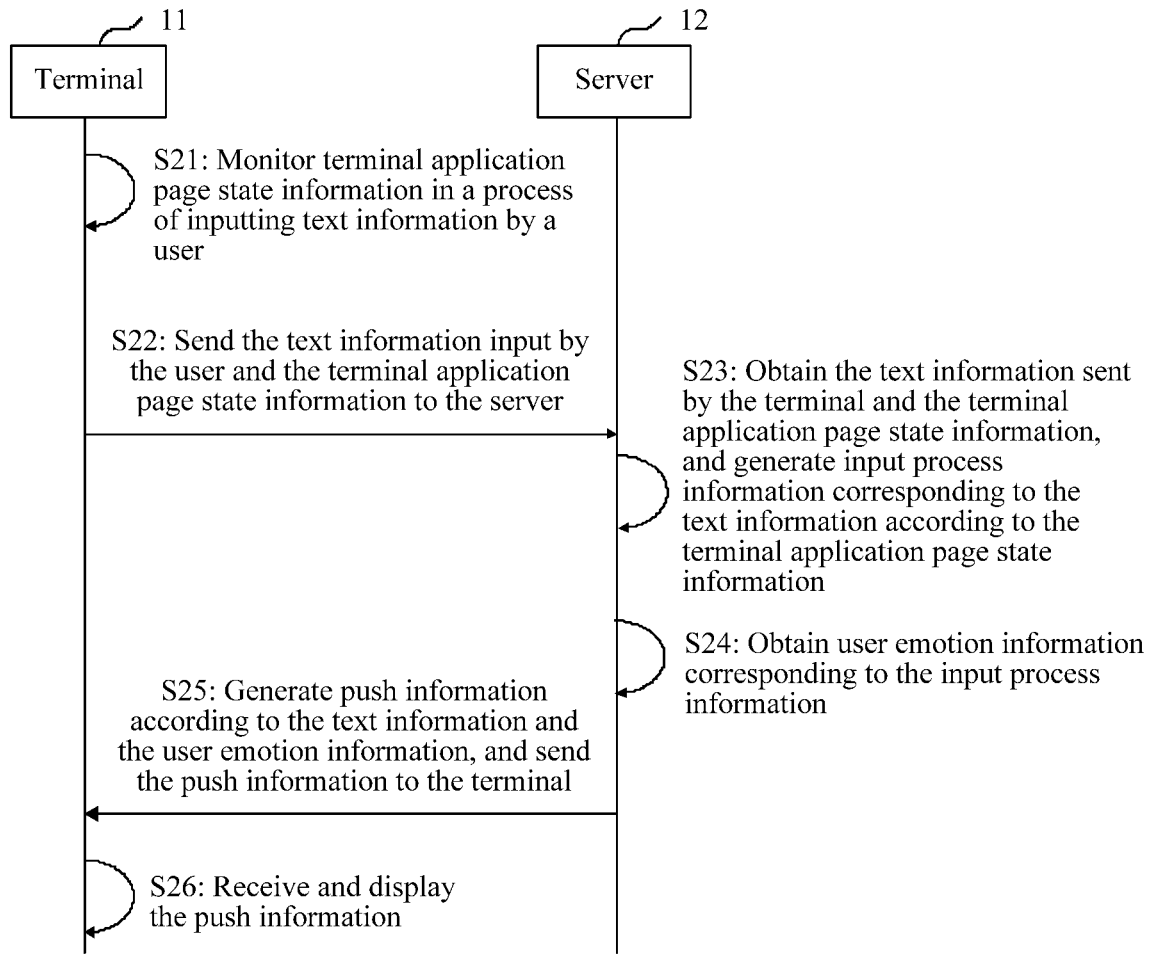
FIG. 4 is another schematic diagram of an interaction between a terminal and a server according to an embodiment of this application.

Referring to FIG. 4, FIG. 4 is another schematic diagram of an interaction between a terminal and a server according to an embodiment of this application.

S21: The terminal 11 monitors terminal application page state information in a process of inputting text information by a user.

In some embodiments, the terminal 11 monitors the application page state information in the process of inputting the text information by the user, the application page state information includes at least one of: an application interface entering event and a generation time of the application interface entering event, a text input box selection event (e.g., a text input box clicking/touching event) and a generation time of the text input box selection event, a focus switch event and a generation time of the focus switch event, or a sending instruction selection event (e.g., a sending button clicking event) and a generation time of the sending instruction selection event.

In some embodiments, the process of inputting the text information by the user is a process from entering an application interface of a terminal by the user to clicking a sending button 112 by the user. That the terminal 11 monitors the terminal application page state information in the process of inputting the text information by the user specifically includes the following steps:

A1: The terminal 11 monitors an application interface entering event generated when the user enters the application interface of the terminal 11, and records a generation time point of the application interface entering event.

A2: The terminal 11 monitors a text input box clicking event generated when the user clicks the text input box 111, and records a generation time point of the text input box clicking event.

A3: The terminal 11 monitors a focus switch event generated when the text input box 111 loses focus, and records a generation time point of the focus switch event.

A4: The terminal 11 monitors a sending button clicking event generated when the user clicks the sending button 112, and records a generation time point of the sending button clicking event.

In some embodiments, the terminal application page state information includes an application interface entering event, a text input box clicking event, a focus switch event, a sending button clicking event, and a generation time corresponding to each event. It may be understood that, in other embodiments, the terminal application page state information may include one of or any combination of the foregoing several events, or may include other events not listed above.

Each time when the terminal 11 monitors/detects an occurrence of an event and a generation time corresponding to the event (e.g., a timestamp when the event happens), the terminal 11 sends the event and the corresponding generation time point to the server 12. Alternatively, after monitoring all events and corresponding generation times, the terminal 11 sends all the events and corresponding generation time points to the server 12. Alternatively, the terminal 11 sends all the events, the corresponding generation time points, and the text information to the server 12. The manner for sending the terminal application page state information by the terminal 11 is not limited to the foregoing three types, which is not specifically limited herein.

S22: The terminal 11 sends the text information input by the user and the terminal application page state information to the server 12.

In some embodiments, to reduce the quantity of times of interactions between the terminal 11 and the server 12, and reduce duration during which the terminal 11 occupies resources of the server 12, the terminal 11 sends the text information input by the user and the terminal application page state information to the server 12.

S23: The server 12 obtains the text information sent by the terminal and the terminal application page state information, and generates input process information corresponding to the text information according to the terminal application page state information.

In some embodiments, application page state information sent by the terminal is received. The application page state information includes at least one of: an application interface entering event and a generation time thereof, a text input box clicking event and a generation time thereof, a focus switch event and a generation time thereof, and a sending button clicking event and a generation time thereof. The input process information is generated according to the application page state information.

In some embodiments, after obtaining the terminal application page state information, the server 12 generates the input process information corresponding to the text information according to the terminal application page state information, which specifically includes the following steps:

A5: The server 12 generates response duration according to the generation time point of the application interface entering event and the generation time point of the text input box clicking event.

A6: The server 12 generates input duration according to the generation time point of the text input box clicking event and the generation time point of the sending button clicking event.

A7: The server 12 generates focus switch operation information according to the focus switch event and the corresponding generation time point. For example, the server 12 calculates the quantity of times of focus switches according to a quantity of received focus switch events, and calculates a focus switch time interval according to a generation time point corresponding to each focus switch event. Alternatively, if the focus switch event carries identification information of a switch type, the server 12 may generate a focus switch type according to the identification information of the switch type in the focus switch event.

It should be noted that, in some embodiments, the input process information includes response duration, input duration, and focus switch operation information. In other embodiments, the input process information may also be any one of or a combination of any two of the foregoing three types, or certainly may include other information not listed, which is not specifically limited herein.

In addition, in some embodiments, the input process information corresponding to the text information is generated by the server 12 according to the terminal application page state information, and no resources of a terminal processor are occupied to generate the input process information, to improve a speed of processing other data by the terminal 11, and not to affect normal using of the terminal 11 by the user.

S24: The server 12 obtains user emotion information corresponding to the input process information.

In some embodiments, before performing step S23, the server 12 further performs the step of pre-storing a correspondence between the input process information and the user emotion information. The server 12 obtains the user emotion information corresponding to the input process information from the correspondence.

In some embodiments, when no user emotion information corresponding to the input process information exists in the correspondence, the server 12 sends emotion query information to the terminal 11, so that the terminal 11 obtains, according to the emotion query information, current emotion information input by the user, and sends the current emotion information to the server 12. In this case, the current emotion information is user emotion information corresponding to the input process information.

S25: The server 12 generates push information according to the text information and the user emotion information, and sends the push information to the terminal 11.

Specifically, the server 12 generates push information according to the text information and the user emotion information obtained in the correspondence, or according to the text information and the current emotion information received from the terminal 11, and sends the push information to the terminal 11.

The push information may include word information and a corresponding watching link. Certainly, in other embodiments, the push information may not include the corresponding watching link. In this case, the user may copy the recommended movie name and entertainment program name to a corresponding player to watch. In addition, the push information may further include information such as a corresponding picture. For example, during recommendation of a movie, a promotion picture and the like of the movie may be attached. The push information is not specifically limited herein.

S26: The terminal 11 receives and displays the push information.

The terminal 11 receives push information sent by the server 12, and displays the push information, so that the user may browse the push information.

In some embodiments, the terminal 11 monitors terminal application page state information in a process of inputting text information by a user, and then sends the text information and the terminal application page state information to the server 12. The server 12 generates input process information corresponding to the text information according to the terminal application page state information, then obtains user emotion information corresponding to the input process information, generates push information according to the user emotion information and the text information, and feeds back the push information to the terminal 11. The terminal 11 displays the push information to the user. In some embodiments, the input process information corresponding to the text information is generated by the server 12, to reduce a data processing amount of the terminal 11, and to avoid a phenomenon such as stuttering due to occupation of more resources of the terminal 11. Meanwhile, because the push information is generated according to the user emotion information and the text information in the method, a quantity of times of interactions for transmission of push information between the terminal 11 and the server 12 is reduced, to reduce running burden of the server 12.

In some embodiments of this application, the input process information is generated by the terminal 11 and then sent to the server 12. During sending of the input process information, the user identity is also sent to the server 12.

Figure 5:
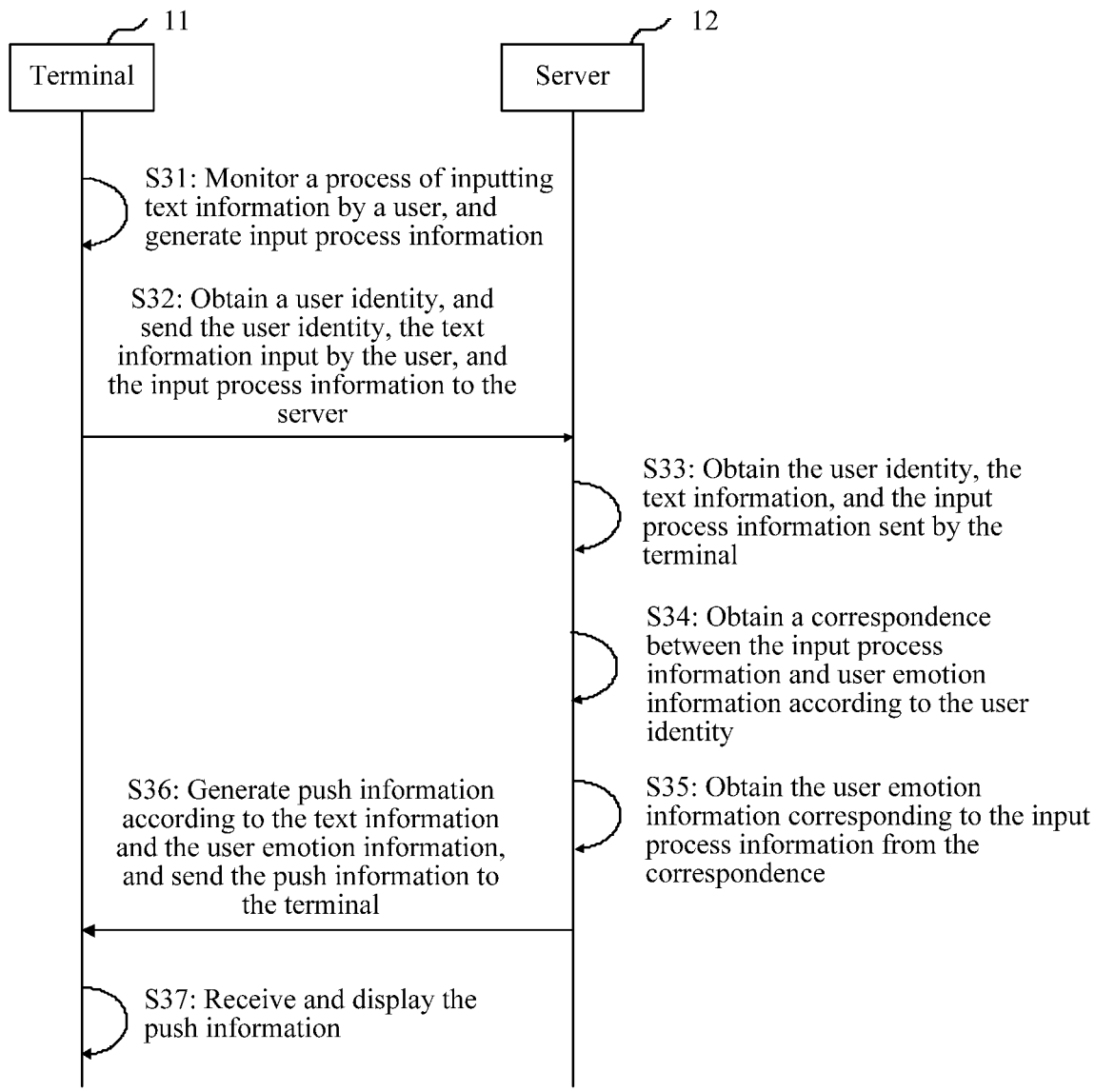
FIG. 5 is still another schematic diagram of an interaction between a terminal and a server according to an embodiment of this application.

Referring to FIG. 5, FIG. 5 is another schematic diagram of an interaction between the terminal 11 and the server 12 according to an embodiment of this application.

S31: The terminal 11 monitors a process of inputting text information by a user, and generates input process information.

In some embodiments, the process of inputting the text information by the user is a process from entering an application interface of a terminal by the user to clicking a sending button 112 by the user. In other embodiments, the process of inputting the text information by the user may be another process, and is not specifically limited herein.

In some embodiments, the input process information includes response duration, input duration, and focus switch operation information. The response duration may be duration consumed from entering the application interface of the terminal to clicking the text input box 111 by the user; the input duration may be duration consumed from clicking the text input box 111 by the user to clicking the sending button 112; and the focus switch operation information may be focus switch operation information that the text input box 111 loses focus, and include a quantity of times of focus switches, a focus switch type, and/or a focus switch time interval.

Certainly, in other embodiments, the input process information may also be any one of or a combination of any two of the foregoing three types, or may include other information not listed, which is not specifically limited herein.

In some embodiments, during monitoring the process of inputting the text information by the user, the terminal 11 further obtains the text information input by the user.

S32: The terminal 11 obtains a user identity, and sends the user identity, the text information, and the input process information to the server.

Herein, the user identity may include international mobile equipment identity code, that is, IMEI code, an account for a user to register in an application, and the like of the terminal 11, and user identity can be used provided that the server 12 can identify the identity of the user according to the user identity.

The terminal 11 sends the user identity, the text information, and the input process information to the server 12 respectively, or performs an aggregation operation on the user identity, the text information, and the input process information, for example, combines the user identity, the text information, and the input process information into one file, and then sends aggregated information to the server 12.

S33: The server 12 obtains the user identity and the text information sent by the terminal 11, and obtains input process information corresponding to the text information.

In some embodiments, that the server 12 receives the input process information sent by the terminal 11 specifically includes: receiving response duration, input duration, and focus switch operation information sent by the terminal 11.

In other embodiments, the input process information received by the server 12 may also be any one of or a combination of any two of the foregoing three types, or certainly may include other information not listed, which is not specifically limited herein.

S34: The server 12 obtains a correspondence between the input process information and user emotion information according to the user identity.

In some embodiments, before performing step S33, the server 12 further performs: pre-storing a correspondence between the input process information and the user emotion information, and associating the correspondence with the user identity correspondingly.

Generally, users usually act differently when inputting a text. For example, some users decisively input wanted content in a happy emotion state, but some users also decisively input wanted content in an angry emotion state, or input text information in an angry emotion state in a speed higher than in a happy emotion state.

Therefore, to improve accuracy of the push information of the server 12, and implement personalized settings of the push information, the server 12 associates the user identity with the correspondence correspondingly, so that both the user emotion information and the input process information stored in the correspondence are related to the user corresponding to the user identity.

In some embodiments, when obtaining the user identity, the server 12 obtains the corresponding correspondence according to the user identity.

S35: The server 12 obtains the user emotion information corresponding to the input process information from the correspondence.

Specifically, the server 12 first determines whether corresponding user emotion information exists in the correspondence, if the corresponding user emotion information exists in the correspondence, obtains the corresponding user emotion information; and if the corresponding user emotion information does not exist in the correspondence, sends emotion query information to the terminal 11, and receives current emotion information of the user sent by the terminal 11 according to the emotion query information. Obviously, the current emotion information is user emotion information corresponding to the input process information.

In some embodiments, the emotion query information may appear in a form of a questionnaire survey. The emotion query information includes a plurality of emotion options, and the user only needs to select one option appropriate for a current emotion state, to finish the operation of inputting current emotion information. The terminal 11 obtains the current emotion information selected by the user.

In some embodiments, the emotion query information may appear in a query form, such as: "How do you feel now?", and other similar sentences. The user inputs the current emotion information in the corresponding text input box 111 according to the emotion query information, for example, inputs "hesitating", "happy", and the like in the corresponding text input box 111, so that the terminal 11 obtains the current emotion information input by the user.

It may be understood that, the manner for querying the current emotion information of the user is not limited to the foregoing questionnaire survey and questioning and query manners, and may further be another form, which is not specifically limited herein.

After obtaining the current emotion information input by the user, the terminal 11 sends the current emotion information to the server 12.

The server 12 obtains the current emotion information sent by the terminal 11, where the current emotion information is user emotion information corresponding to the input process information.

S36: The server 12 generates push information according to the text information and the user emotion information, and sends the push information to the terminal 11.

After obtaining the text information, the server 12 performs semantic identification on the text information by using an artificial intelligence identification module or the like, to obtain an intention of the user.

The server 12 generates push information based on a preset processing rule according to the text information and the user emotion information obtained in the correspondence, or according to the text information and the current emotion information received from the terminal 11.

In some embodiments, the preset processing rule may be a rule related to the user emotion information and the text information. For example, if the obtained user emotion information is a hesitating emotion, and the text information is "I want to watch a movie", the preset processing rule may be set to push content corresponding to the text information and other content, for example, push several movies and several entertainment programs having relatively high network scores. In this way, the user may perform a free selection in the movies and entertainment programs.

For another example, when the text information carries emotion type information, for example, the text information is "I am unhappy and want to watch a movie", in this case, the server 12 may identify that the user emotion is "unhappy" and the intention of the user is "want to watch a movie" by using the artificial intelligence identification module. In this case, in the preset processing rule, a weight value of a user emotion corresponding to the text information is set to be greater than a weight value of the user emotion information corresponding to the input process information, so that push information more appropriate for the user emotion may be obtained.

Certainly, the preset processing rule may not only be related to the user emotion information and the text information, but also be related to information such as hobbies and experiments of the user. For example, if the user usually likes to watch funny entertainment programs, the preset processing rule may be set to push comedy content corresponding to the text information and other comedy content, for example, push a comedy movie, a plurality of funny entertainment programs, and the like with relatively high network scores.

It may be understood that, the preset processing rule may be set according to an actual requirement. Specific content of the preset processing rule is not limited herein. Meanwhile, to push information to the user more accurately, the preset processing rule may be updated continuously, to adapt to changes of society and times, so that the push information better adapts to the user requirement.

In some embodiments, the push information may include word information and a corresponding watching link, for example, a movie name, an entertainment program name, and corresponding watching links. The push information may also be in other forms, which is not specifically limited herein.

In some embodiments, when generating the push information according to the current emotion information and the text information, the server 12 further stores the current emotion information and the input process information to the correspondence, to perfect the correspondence with the user identity.

S37: The terminal 11 receives and displays the push information.

After receiving the push information fed back by the server 12, the terminal 11 displays the push information, so that the user may browse the push information.

As can be known from the foregoing, in some embodiments, the terminal 11 monitors a process of inputting text information by a user and generates input process information, and then sends a user identity, the text information and the input process information to the server 12. The server 12 obtains a pre-stored correspondence between the input process information and user emotion information according to the user identity, obtains user emotion information corresponding to the input process information from the correspondence, then generates push information according to the user emotion information and the text information, and sends the push information to the terminal 11. The terminal 11 displays the push information to the user. In some embodiments, a user identity of each user corresponds to one correspondence. The server 12 obtains the correspondence according to the obtained user identity, obtains user emotion information from the correspondence, and provides push information that better adapts to a user requirement to the user according to the user emotion information and the text information, to improve accuracy of the push information, reduce a quantity of times of data interactions between the terminal 11 and the server 12, avoid occupying more resources of the server 12, reduce running burden of the server 12, and also implement personalized settings of the push information.

In some embodiments of this application, the information sending method for a terminal provided in some embodiments of this application may further be described from the perspective of an information sending apparatus for a terminal, and is performed by the information sending apparatus for the terminal. The information sending apparatus may be specifically integrated in the terminal 11.

Figure 6:
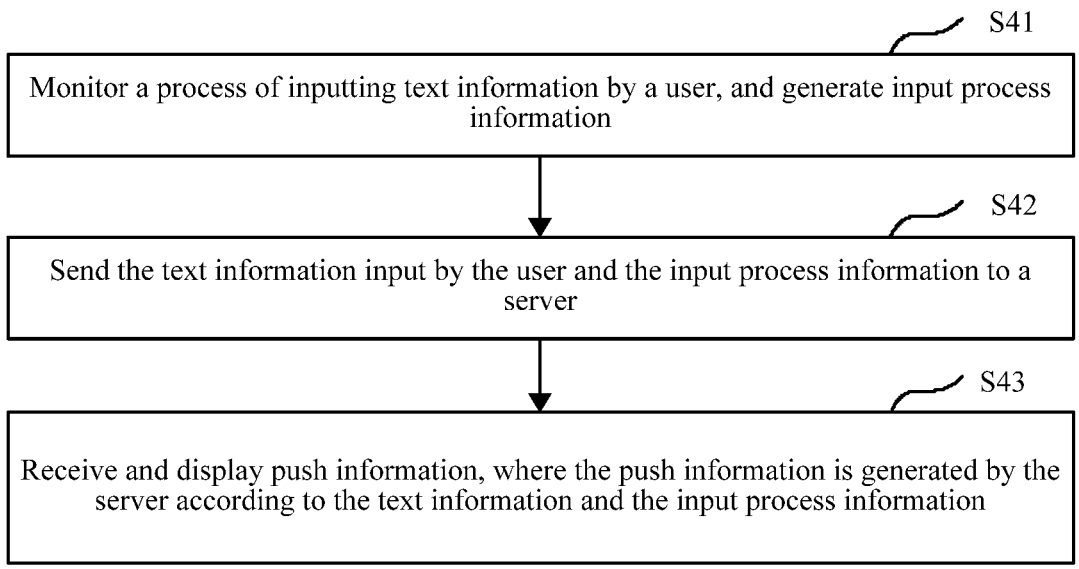
FIG. 6 is a schematic flowchart of an information sending method according to an embodiment of this application.

Referring to FIG. 6, FIG. 6 is a schematic flowchart of an information sending method for a terminal according to an embodiment of this application.

S41: The terminal 11 monitors a process of inputting text information by a user, and generates input process information.

In some embodiments, the process of inputting the text information by the user is a process from entering an application interface of a terminal by the user to clicking a sending button 112 by the user. In other embodiments, the process of inputting the text information by the user may be another process, and is not specifically limited herein.

In a specific implementation process, the input process information includes response duration, input duration, and focus switch operation information. The response duration may be duration consumed from entering the application interface of the terminal to clicking the text input box 111 by the user; the input duration may be duration consumed from clicking the text input box 111 by the user to clicking the sending button 112; and the focus switch operation information may be focus switch operation information that the text input box 111 loses focus, and include a quantity of times of focus switches, a focus switch type, and/or a focus switch time interval.

In other embodiments, the input process information may also be any one of or a combination of any two of the foregoing three types, or may include other information not listed, and is not specifically limited herein.

It may be understood that, during monitoring the process of inputting the text information by the user, the terminal 11 further obtains the text information input by the user.

S42: The terminal 11 sends the text information input by the user and the input process information to the server 12.

In a specific implementation process, the terminal 11 further performs aggregation processing on the text information and the input process information, and sends aggregated information to the server 12.

In some embodiments, the terminal 11 further obtains a user identity, and sends the user identity, the text information, and the input process information to the server 12. Herein, the user identity may include international mobile equipment identity code, an account for a user to register in an application, and the like of the terminal 11.

In some embodiments, the server 12 receives the text information and the input process information sent by the terminal, obtains a pre-stored correspondence between the input process information and the user emotion information according to the input process information, and then obtains user emotion information corresponding to the received input process information from the correspondence. Finally, the server 12 generates push information according to the user emotion information and the text information, and sends the push information to the terminal 11.

In some embodiments, the server 12 further receives the user identity sent by the terminal 11 and obtains the pre-stored correspondence between the input process information and the user emotion information according to the user identity. In some embodiments, the correspondence and the user identity are in one-to-one correspondence, that is, each user has a dedicated correspondence. After obtaining the correspondence according to the user identity, the server 12 obtains user emotion information corresponding to the received input process information from the correspondence, generates push information according to the user emotion information and the text information, and sends the push information to the terminal 11.

S43: The terminal 11 receives and displays the push information, where the push information is generated by the server 12 according to the text information and the input process information.

In some embodiments, if the server 12 does not obtain the user emotion information corresponding to the input process information from the correspondence, the server 12 sends emotion query information to the terminal 11. The terminal 11 obtains the emotion query information sent by the server, obtains, according to the emotion query information, current emotion information input by the user, and sends the current emotion information to the server 12. The server 12 generates push information according to the current emotion information and the text information sent by the terminal 11, and sends the push information to the terminal 11. The terminal 11 then performs step S43.

As can be learned from the foregoing, in some embodiments, the terminal 11 monitors a process of inputting text information by a user and generates input process information, and then sends the text information and the input process information to the server 12. The server 12 obtains user emotion information corresponding to the input process information, generates push information according to the user emotion information and the text information, and sends the push information to the terminal 11. The terminal 11 receives and displays the push information. In the method, when the text information input by the user is obtained, the process of inputting the text information is further monitored to generate the input process information, so that the server 12 pushes more appropriate push information to the user according to the input process information and the text information. The method can reduce a quantity of times of data interactions between the terminal 11 and the server 12, to further reduce running burden of the terminal 11.

In some embodiments of this application, the information push method for a server provided in some embodiments of this application may further be described from the perspective of an information push apparatus for a server, and is performed by the information push apparatus for the server. The information push apparatus for the server may be specifically integrated in the server 12.

Figure 7:
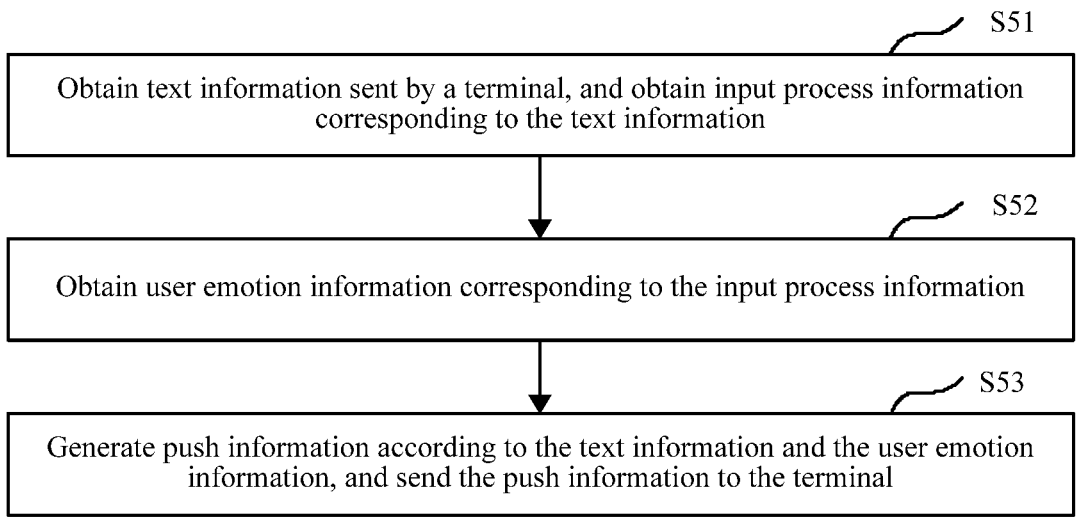
FIG. 7 is a schematic flowchart of an information push method according to an embodiment of this application.

Referring to FIG. 7, FIG. 7 is a schematic flowchart of an information push method for a server according to an embodiment of this application.

S51: The server 12 obtains text information sent by the terminal 11, and obtains input process information corresponding to the text information.

That the server 12 receives the input process information sent by the terminal 11 specifically includes: receiving information, such as response duration, input duration, and focus switch operation information, sent by the terminal 11.

Specifically, the response duration is duration consumed from entering a terminal interface to clicking the text input box 111 by the user; the input duration is duration consumed from clicking the text input box 111 by the user to clicking the sending button 112; and the focus switch operation information is focus switch operation information that the text input box 111 loses focus, where the focus switch operation information includes a quantity of times of focus switches, a focus switch type, and/or a focus switch time interval.

Certainly, the input process information received by the server 12 may also be any one of or a combination of any two of the foregoing three types, or may include other information not listed, which is not specifically limited herein.

In some embodiments, the step of obtaining the input process information corresponding to the text information by the server 12 may further be: generating the input process information corresponding to the text information according to terminal application page state information sent by the terminal 11. In some embodiments, the terminal application page state information includes an application interface entering event, a text input box clicking event, a focus switch event, a sending button clicking event, and a generation time corresponding to each event. It may be understood that, the terminal application page state information may include one of or any combination of the foregoing several events, and is not listed herein.

That the server 12 generates the input process information corresponding to the text information according to the terminal application page state information sent by the terminal 11 specifically includes the following steps:

B1: The server 12 generates response duration according to a generation time point of the application interface entering event and a generation time point of the text input box clicking event.

B2: The server 12 generates input duration according to a generation time point of the text input box clicking event and a generation time point of the sending button clicking event.

B3: The server 12 generates focus switch operation information according to the focus switch event and the corresponding generation time point.

In some embodiments, the server 12 further obtains a user identity sent by the terminal 11. Herein, the user identity may include international mobile equipment identity code, an account for a user to register in an application, and the like of the terminal 11.

S52: The server 12 obtains user emotion information corresponding to the input process information.

In some embodiments, before performing step S51, the server 12 further needs to perform the step of pre-storing a correspondence between the input process information and the user emotion information.

When the server 12 obtains the input process information, the server 12 reads a correspondence, and obtains user emotion information corresponding to the input process information from the correspondence.

In some embodiments, when performing the step of pre-storing the correspondence between the input process information and the user emotion information, the server 12 further needs to perform the step of associating the correspondence with the user identity correspondingly. That is, each user corresponds to one dedicated correspondence. Then, the server 12 obtains a corresponding correspondence according to the obtained user identity, and obtains user emotion information corresponding to the input process information from the correspondence.

No matter whether the correspondence is associated with the user identity, the server 12 first determines whether corresponding user emotion information exists in the correspondence, if the corresponding user emotion information exists in the correspondence, obtains the corresponding user emotion information; if the corresponding user emotion information does not exist in the correspondence, sends emotion query information to the terminal 11 and receives current emotion information of the user sent by the terminal 11 according to the emotion query information. Obviously, the current emotion information is user emotion information corresponding to the input process information.

S53: The server 12 generates push information according to the text information and the user emotion information, and sends the push information to the terminal.

The server 12 generates push information based on a preset processing rule according to the text information and the user emotion information, or the text information and the current emotion information, and sends the push information to the terminal 11.

Specifically, the preset processing rule may be a rule related to the user emotion information and the text information. For example, if the obtained user emotion information is a hesitating emotion, and the text information is "I want to watch a movie", the preset processing rule may be set to push content corresponding to the text information and other content, for example, push several movies and several entertainment programs having relatively high network scores. In this way, the user may perform a free selection in the movies and entertainment programs.

For another example, when the text information carries emotion type information, for example, the text information is "I am unhappy and want to watch a movie", in this case, the server 12 may identify that the user emotion is "unhappy" and the intention of the user is "want to watch a movie" by using an artificial intelligence identification module. In this case, in the preset processing rule, a weight value of a user emotion corresponding to the text information is set to be greater than a weight value of user emotion information corresponding to the input process information, so that push information more appropriate for the user emotion may be obtained.

Certainly, alternatively, the preset processing rule may not only be related to the user emotion information and the text information, but also be related to information such as hobbies and experiments of the user. For example, if the user usually likes to watch funny entertainment programs, the preset processing rule may be set to push comedy content corresponding to the text information and other comedy content, for example, push a comedy movie, a plurality of funny entertainment programs, and the like with relatively high network scores.

It may be understood that, the preset processing rule may be set according to an actual requirement. Specific content of the preset processing rule is not limited herein. Meanwhile, to push information to the user more accurately, the preset processing rule may be updated continuously, to adapt to changes of society and times, so that the push information better adapts to the user requirement.

In some embodiments, the push information may include text information and a corresponding watching link. Certainly, in other embodiments, the push information may alternatively not include the corresponding watching links. In this case, the user may copy the recommended movie name and entertainment program name to a corresponding player to watch. In addition, the push information may further include information such as a corresponding picture. For example, during recommendation of a movie, a promotion picture and the like of the movie may be attached. The push information is not specifically limited herein.

In some embodiments, when generating the push information according to the text information and the current emotion information, the server 12 further stores the current emotion information and the input process information to the correspondence, to perfect the correspondence.

As can be learned from the foregoing, in some embodiments, when obtaining the text information and the input process information, the server 12 obtains user emotion information corresponding to the input process information, generates push information according to the user emotion information and the text information, and sends the push information to the terminal 11, so that the terminal 11 displays the push information to the user. In the method, the user emotion information is obtained according to the input process information, and more appropriate push information is provided to the user according to the user emotion information and the text information, to improve accuracy of the push information, reduce a quantity of times of data interactions between the server 12 and the terminal 11, avoid occupying more resources of the server 12, and reduce running burden of the server 12.

Figure 8A:
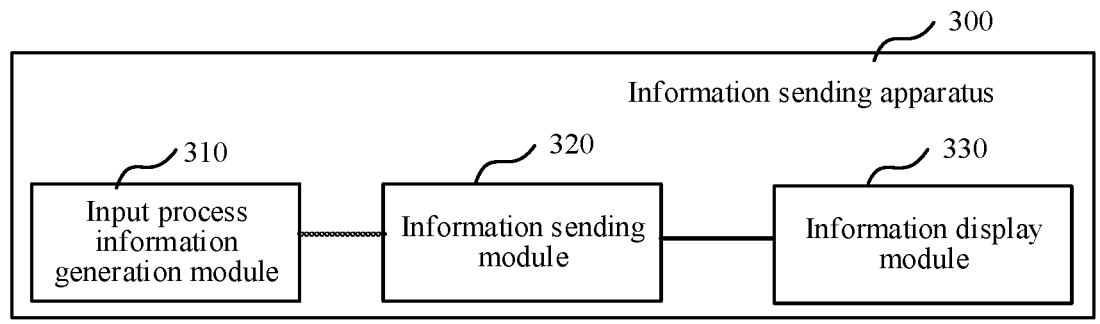
FIG. 8a is a schematic structural diagram of an information sending apparatus according to an embodiment of this application.

To better implementation the foregoing method, an embodiment of this application further provides an information sending apparatus for a terminal. As shown in FIG. 8a, the information sending apparatus 300 may be integrated in the terminal 11. The information sending apparatus 300 may include an input process information generation module 310, an information sending module 320, and an information display module 330.

The input process information generation module 310 is configured to monitor a process of inputting text information by a user and generate input process information.

In some embodiments, the process of inputting the text information by the user is a process from entering an application interface of a terminal by the user to clicking a sending button 112 by the user. The input process information generation module 310 monitors the process of inputting the text information by the user and generate response duration, input duration, and/or focus switch operation information.

The response duration may be duration consumed from entering the application interface of the terminal to clicking the text input box 111 by the user; the input duration may be duration consumed from clicking the text input box 111 by the user to clicking the sending button 112; and the focus switch operation information may be focus switch operation information that the text input box 111 loses focus, and include a quantity of times of focus switches, a focus switch type, and/or a focus switch time interval.

Certainly, in other embodiments, the input process information may alternatively be any one of or a combination of any two of the foregoing three types, or certainly may include other information not listed, which is not specifically limited herein.

It may be understood that, the input process information generation module 310 monitors the process of inputting the text information by the user, and further obtains words input in a text by the user, that is, text information.

The information sending module 320 is configured to send the text information input by the user and the input process information to the server.

Figure 8B:
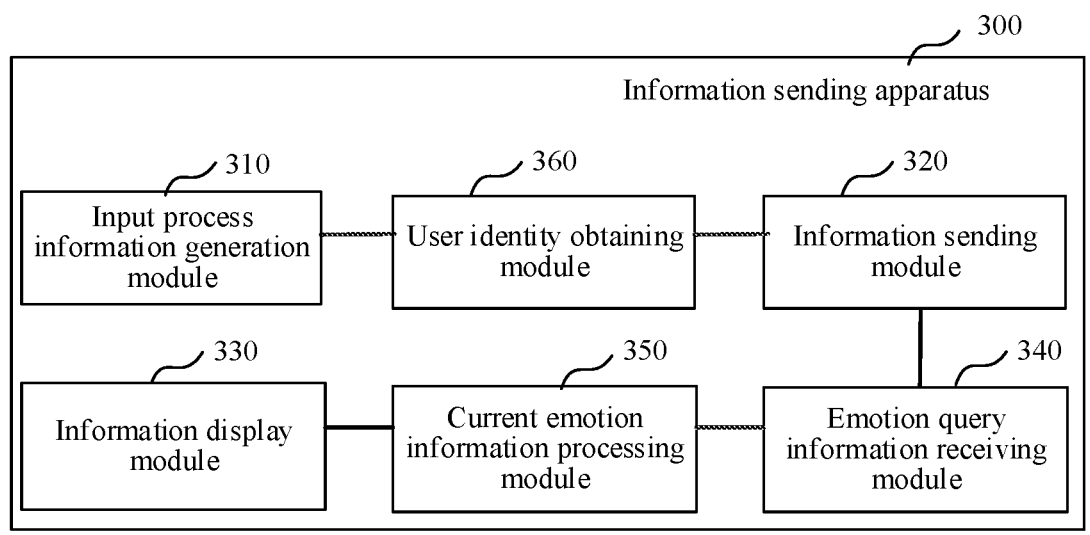
FIG. 8b is another schematic structural diagram of an information sending apparatus according to an embodiment of this application.

In some embodiments, as shown in FIG. 8b, the apparatus further includes a user identity obtaining module 360. The user identity obtaining module 360 is configured to obtain a user identity. The user identity obtaining module 360 transmit the user identity to the information sending module 320. The information sending module 320 is configured to send the user identity, the text information, and the input process information to the server 12.

In a specific implementation process, the server 12 receives the text information and the input process information sent by the information sending module 320, obtains a pre-stored correspondence between the input process information and the user emotion information, and then obtains user emotion information corresponding to the received input process information from the correspondence. Finally, the server 12 generates push information according to the user emotion information and the text information, and sends the push information to the information sending apparatus 300.

In some embodiments, after receiving the user identity sent by the information sending module 320, the server 12 further obtains the pre-stored correspondence between the input process information and the user emotion information according to the user identity. After obtaining the correspondence according to the user identity, the server 12 obtains user emotion information corresponding to the received input process information from the correspondence, generates push information according to the user emotion information and the text information, and sends the push information to the information sending apparatus 300.

The information display module 330 is configured to receive and display push information, where the push information is generated by the server according to the text information and the input process information.

In some embodiments, as shown in FIG. 8b, the information sending apparatus 300 further includes an emotion query information receiving module 340 and a current emotion information processing module 350.

In some embodiments, if the user emotion information corresponding to the input process information does not exist in the correspondence, the server 12 sends the emotion query information to the information sending apparatus 300. The emotion query information receiving module 340 receives the emotion query information. The current emotion information processing module 350 obtains the current emotion information input by the user according to the emotion query information, and sends the current emotion information to the server 12.

In this way, the server 12 generates push information according to the current emotion information and the text information sent by the terminal 11, and sends the push information to the information sending apparatus 300. The information display module 330 receives the push information and displays the push information.

As can be learned from the foregoing, in some embodiments, the input process information generation module 310 monitors a process of inputting text information by a user and generates input process information, the information sending module 320 sends the text information and the input process information to the server 12, the server 12 obtains user emotion information corresponding to the input process information, and generates push information according to the user emotion information and the text information, and sends the push information to the information sending apparatus 300, and the information display module 330 receives and displays the push information. When obtaining the text information input by the user, the input process information generation module 310 in the apparatus further monitors the process of inputting the text information to generate input process information, so that the server 12 pushes more appropriate push information to a user according to the input process information and the text information, to reduce a quantity of times of data interactions between the information sending apparatus 300 and the server 12, and running burden of the terminal 11 installed with the information sending apparatus 300.

Figure 8C:
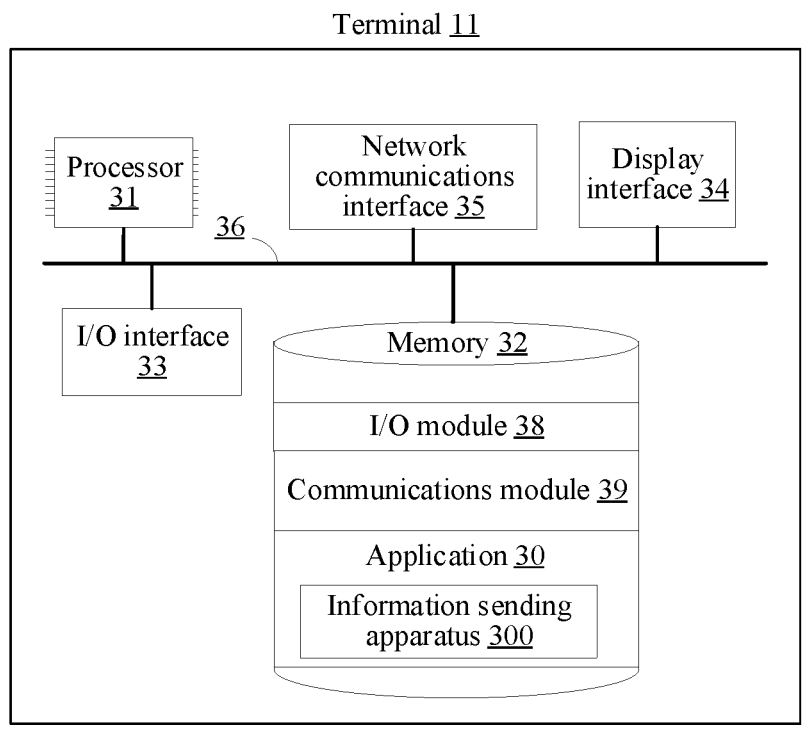
FIG. 8c is a schematic diagram of a hardware structure of a terminal according to an embodiment of this application.

FIG. 8c is a schematic structural diagram of a terminal used in an information sending method for a terminal according to an embodiment of this application. As shown in FIG. 8c, the terminal 11 include a processor 31, a non-volatile computer readable memory 32, an I/O interface 33, a display interface 34, and a network communications interface 35. These components perform communication through a bus 36. In some embodiments of this application, the memory 32 stores a plurality of program modules: an operating system 37, an I/O module 38, a communications module 39, and an application 30. The processor 31 may read the program module in the memory 32 to implement the solution provided in some embodiments of this application.

In some embodiments of this application, the I/O interface 33 may be connected to an input/output device. The I/O interface 33 sends input data received from the input device to the I/O module 38 for processing, and sends data output by the I/O module 38 to the output device.

The network communications interface 35 may send data received from the communications bus 36 to the communications module 39, and sends the data received from the communications module 39 through the communications bus 36.

Figure 9A:
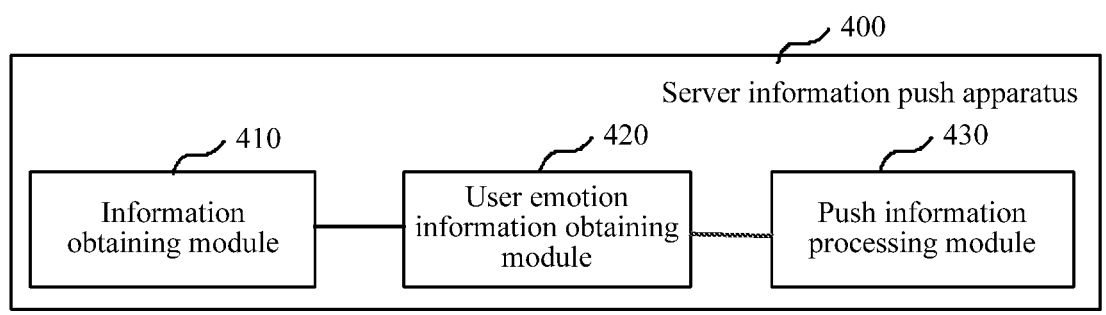
FIG. 9a is a schematic structural diagram of an information push apparatus according to an embodiment of this application.

The application 30 stored in the memory 32 may include various applications for implementing the information sending method, such as some or all units in the information sending apparatus 300 shown in FIG. 8a and FIG. 8b. To better implement the foregoing method, some embodiments of this application further provides an information push apparatus for a server. As shown in FIG. 9a, the information push apparatus 400 may include an information obtaining module 410, a user emotion information obtaining module 420, and a push information processing module 430.

The information obtaining module 410 is configured to obtain text information sent by a terminal, and obtain input process information corresponding to the text information.

For example, the information obtaining module 410 may obtain text information, response duration, input duration, and focus switch operation information sent by the terminal.

The response duration is duration consumed from entering a terminal interface to clicking a text input box 111 by the user. The input duration is duration consumed from clicking the text input box 111 by the user to clicking a sending button 112. The focus switch operation information is focus switch operation information that the text input box 111 loses focus, where the focus switch operation information includes a quantity of times of focus switches, a focus switch type, and/or a focus switch time interval.

In some embodiments, the information obtaining module 410 further obtains a user identity sent by the terminal. Herein, a terminal identity of the user may include international mobile equipment identity code, an account for a user to register in an application, and the like of the terminal 11.

In some embodiments, the information obtaining module 410 may further generate input process information corresponding to the text information according to terminal application page state information sent by the terminal 11.

Herein, the terminal application page state information includes an application interface entering event, a text input box clicking event, a focus switch event, a sending button clicking event, and a generation time corresponding to each event. It may be understood that, in other embodiments, the terminal application page state information may include one of or any combination of the foregoing several events, or may include other events not listed above.

That the information obtaining module 410 generates the input process information corresponding to the text information according to the terminal application page state information sent by the terminal 11 specifically includes the following steps:

(a) The information obtaining module 410 generates response duration according to a generation time point of the application interface entering event and a generation time point of the text input box clicking event.

(b) The information obtaining module 410 generates input duration according to a generation time point of the text input box clicking event and a generation time point of the sending button clicking event.

(c) The information obtaining module 410 generates focus switch operation information according to the focus switch event and the corresponding generation time point.

The user emotion information obtaining module 420 is configured to obtain user emotion information corresponding to the input process information.

Figure 9B:
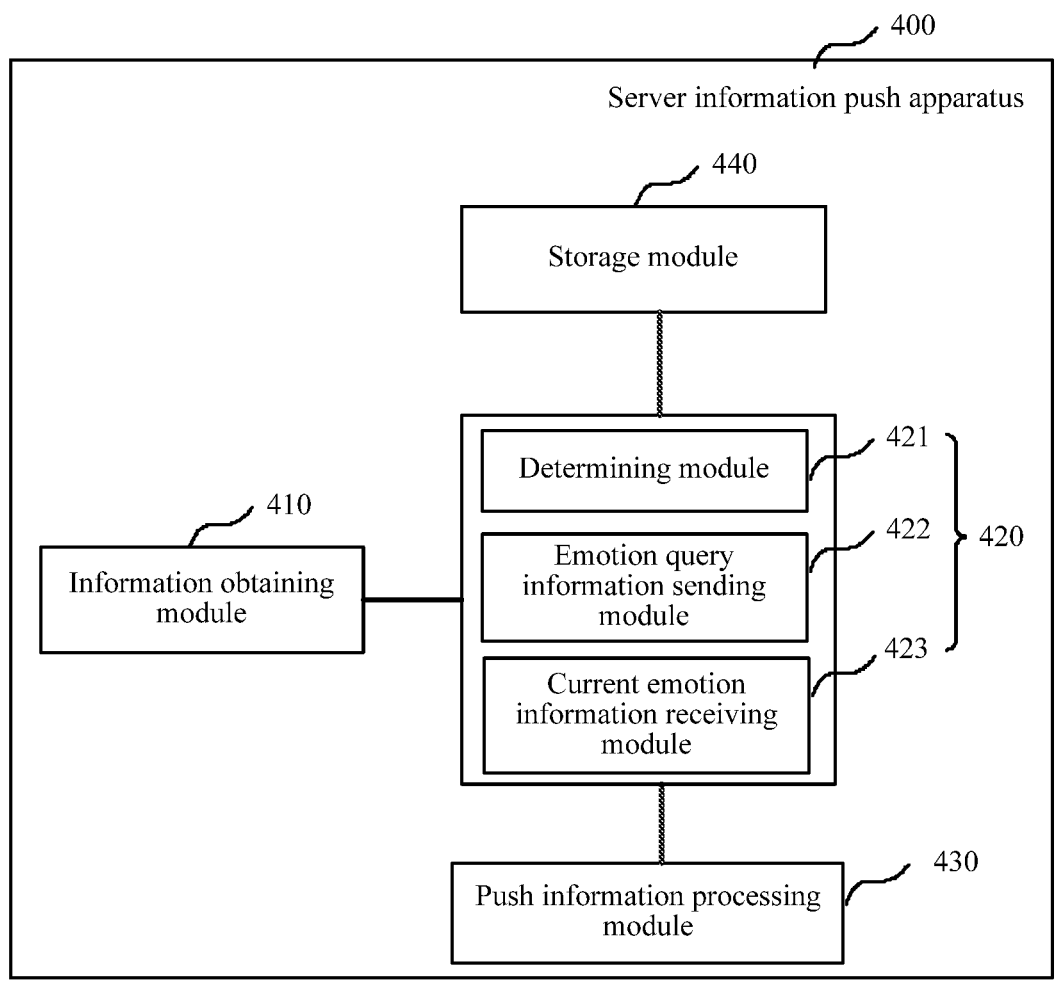
FIG. 9b is another schematic structural diagram of a terminal information push apparatus according to an embodiment of this application.

In some embodiments, referring to FIG. 9b, the information push apparatus for a server 400 further includes a storage module 440. The storage module is configured to pre-store a correspondence between the input process information and the user emotion information. When the information obtaining module 410 obtains the input process information, the user emotion information obtaining module 420 reads a correspondence, and obtains the user emotion information corresponding to the input process information from the correspondence.

In some embodiments, the storage module 440 is further configured to associate the correspondence with the user identity correspondingly. That is, each user has a dedicated correspondence. The user emotion information obtaining module 420 obtains a corresponding correspondence according to the user identity obtained by the information obtaining module 410, and obtains the user emotion information corresponding to the input process information from the correspondence.

No matter whether the correspondence is associated with the user identity, the user emotion information obtaining module 420 specifically includes a determining module 421, an emotion query information sending module 422, and a current emotion information receiving module 423.

The determining module 421 is configured to determine whether the corresponding user emotion information exists in the correspondence.

If the determining module 421 determines that the corresponding user emotion information exists in the correspondence, the current emotion information receiving module 423 obtains the corresponding user emotion information.

If the determining module 421 determines that the corresponding user emotion information does not exist in the correspondence, the emotion query information sending module 422 sends emotion query information to the terminal 11. The current emotion information receiving module 423 is configured to receive current emotion information of the user sent by the terminal 11 according to the emotion query information. The current emotion information is user emotion information corresponding to the input process information.

The push information processing module 430 is configured to generate push information according to the text information and the user emotion information, and send the push information to the terminal.

The push information processing module 430 performs semantic identification on the text information, to obtain an intention of the user. The push information processing module 430 then generates push information based on a preset processing rule according to the text information and the user emotion information, or the text information and the current emotion information, and sends the push information to the terminal 11.

In some embodiments, the preset processing rule may be a rule related to the user emotion information and the text information. For example, if the obtained user emotion information is a hesitating emotion, and the text information is "I want to watch a movie", the preset processing rule may be set to push content corresponding to the text information and other content, for example, push several movies and several entertainment programs having relatively high network scores. In this way, the user may perform a free selection in the movies and entertainment programs.

For another example, when the text information carries emotion type information, for example, the text information is "I am unhappy and want to watch a movie", in this case, the server 12 may identify that the user emotion is "unhappy" and the intention of the user is "want to watch a movie" by using the artificial intelligence identification module. In this case, in the preset processing rule, a weight value of a user emotion corresponding to the text information is set to be greater than a weight value of the user emotion information corresponding to the input process information, so that push information more appropriate for the user emotion may be obtained.

Certainly, the preset processing rule may not only be related to the user emotion information and the text information, but also be related to information such as hobbies and experiments of the user. For example, if the user usually likes to watch funny entertainment programs, the preset processing rule may be set to push comedy content corresponding to the text information and other comedy content, for example, push a comedy movie, a plurality of funny entertainment programs, and the like with relatively high network scores.

It may be understood that, the preset processing rule may be set according to an actual requirement. Specific content of the preset processing rule is not limited herein. Meanwhile, to push information to the user more accurately, the preset processing rule may be updated continuously, to adapt to changes of society and times, so that the push information better adapts to the user requirement.

In some embodiments, the push information may include word information and a corresponding watching link. Certainly, in other embodiments, the push information may alternatively not include the corresponding watching links. In this case, the user may copy the recommended movie name and entertainment program name to a corresponding player to watch. In addition, the push information may further include information such as a corresponding picture. For example, during recommendation of a movie, a promotion picture and the like of the movie may be attached. The push information is not specifically limited herein.

In some embodiments, when generating the push information according to the text information and the current emotion information, the push information processing module 430 further needs to store the current emotion information and the input process information in the correspondence, to perfect the correspondence.

As can be learned from the foregoing, in some embodiments, when the information obtaining module 410 in the information push apparatus for a server 400 obtains text information and input process information, the user emotion information obtaining module 420 obtains user emotion information corresponding to the input process information, and the push information processing module 430 generates push information according to the user emotion information and the text information, and sends the push information to the terminal 11, so that the terminal 11 displays the push information to a user. The apparatus obtains the user emotion information according to the input process information, and provides more appropriate push information to the user according to the user emotion information and the text information, to improve accuracy of the push information, reduce a quantity of times of data interactions between the information push apparatus for a server 400 and the terminal 11, avoid occupying more resources of the server, and reduce running burden of the server 12.

Figure 9C:
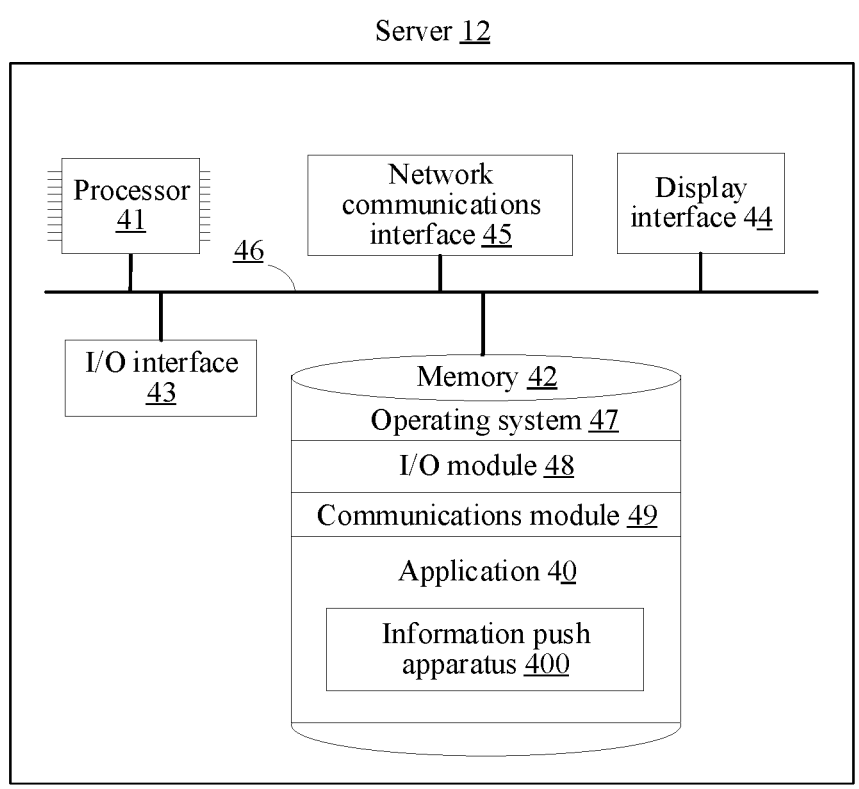
FIG. 9c is a schematic diagram of a hardware structure of a server according to an embodiment of this application.

FIG. 9c is a schematic structural diagram of a server used in an information push method for a server according to an embodiment of this application. As shown in FIG. 9c, the server 12 includes a processor 41, a non-volatile computer readable memory 42, an I/O interface 43, a display interface 44, and a network communications interface 45. These components perform communication through a bus 46. In some embodiments of this application, the memory 42 stores a plurality of program modules: an operating system 47, an I/O module 48, a communications module 49, and an application 40. The processor 41 may read the program module in the memory 42 to implement the solution provided in some embodiments of this application.

In some embodiments of this application, the I/O interface 43 may be connected to an input/output device. The I/O interface 43 sends input data received from the input device to the I/O module 48 for processing, and sends data output by the I/O module 48 to the output device.

The network communications interface 45 may send data received from the communications bus 46 to the communications module 49, and sends data received from the communications module 49 through the communications bus 46.

The application 40 stored in the memory 42 may include various applications for implementing the information push method for a server, for example, some or all units in the information push apparatus for a server 400 shown in FIG. 9a, and FIG. 9b. A person of ordinary skill in the art may understand that all or some of the steps of the various methods in the foregoing embodiments may be implemented by a program instructing relevant hardware. The program may be stored in a computer readable storage medium. The storage medium may include: a read-only memory (ROM), a random access memory (RAM), a magnetic disk, an optical disc, or the like.

The information push method, apparatus, and system provided in the embodiments of this application are described above in detail. Although the principles and implementations of the embodiments of this application are described by using specific examples in this specification, the descriptions of the foregoing embodiments are merely intended to help understand the method and the core idea of the method of the embodiments of this application. Meanwhile, a person skilled in the art may make modifications to the specific implementations and application range according to the idea of the embodiments of this application. In conclusion, the content of this specification should not be construed as a limitation to this application.

What is claimed is:

1. An information push method, performed by a server, comprising:
    obtaining text information sent by a terminal;
    obtaining input process information corresponding to the text information, the input process information comprising at least one of: a response duration, an input duration, and focus switch operation information associated with a process that a user of the terminal enters the text information;
    obtaining first user emotion information corresponding to the input process information, the first user emotion information characterizing an emotion state in the process of inputting the text information by the user, comprising:
        determining whether the first user emotion information exists in pre-stored correspondences between a plurality of user emotion information and a plurality of input process information;
        sending emotion query information to the terminal when the first user emotion information does not exist in the pre-stored correspondences; and
        receiving current emotion information sent by the terminal to be used as the first user emotion information, wherein the current emotion information is input by the user based on the emotion query information;
    generating push information according to the text information and the first user emotion information; and
    sending the push information to the terminal.

2. The method according to claim 1, wherein the text information is input in a text input box in an interface of a terminal application by the user, and sent to the server upon detection of a sending instruction being selected;
    the response duration is duration from a moment at which the interface of the terminal application is entered to a moment at which the text input box is selected;
    the input duration is duration from a moment at which the user clicks the text input box to a moment at which the sending instruction is selected; and
    the focus switch operation information comprises at least one of a quantity of times of focus switches, a focus switch type, or a focus switch time interval.

3. The method according to claim 2, wherein:
    the quantity of times of focus switches is a quantity of times that the text input box loses focus;
    the focus switch type comprises at least one of: performing a switch operation between a plurality of interfaces of the terminal application, running the terminal application at background, or selecting push content in the interface of the terminal application; and
    the focus switch time interval is a time interval between two consecutive focus switch operations.

4. The method according to claim 1, wherein:
    the method further comprises: pre-storing a correspondence between the input process information and the first user emotion information; and
    the obtaining first user emotion information corresponding to the input process information comprises: obtaining the first user emotion information corresponding to the input process information according to the correspondence.

5. The method according to claim 4, wherein the obtaining the first user emotion information corresponding to the input process information according to the correspondence comprises:
    determining the emotion state represented by the first user emotion information as a first emotion state if a sum of the response duration and the input duration is greater than or equal to a first preset value, and the focus switch operation information indicates that a focus switch operation exists; and
    determining the emotion state represented by the first user emotion information as a second emotion state if a sum of the response duration and the input duration is less than a second preset value, and the focus switch operation information indicates that no focus switch operation exists.

6. The method according to claim 4, wherein:
    the pre-storing a correspondence between the input process information and the first user emotion information further comprises: associating the correspondence with a user identity;
    the obtaining input process information corresponding to the text information further comprises: obtaining the user identity; and
    the obtaining the first user emotion information corresponding to the input process information according to the correspondence comprises: obtaining the correspondence according to the user identity; and obtaining the first user emotion information corresponding to the input process information according to the correspondence.

7. The method according to claim 1, wherein the obtaining input process information corresponding to the text information comprises:
    receiving application page state information sent by the terminal, wherein the application page state information comprises at least one of: an application interface entering event and a generation time of the application interface entering event, a text input box selection event and a generation time of the text input box selection event, a focus switch event and a generation time of the focus switch event, or a sending instruction selection event and a generation time of the sending instruction selection event; and
    generating the input process information according to the application page state information.

8. The method according to claim 1, wherein the text information comprises second user emotion information, and the generating push information according to the text information and the first user emotion information comprises:
    generating the push information based on a preset processing rule according to the text information, the first user emotion information, and the second user emotion information, wherein in the preset processing rule, a weight value of the second user emotion information is set to be greater than a weight value of the first user emotion information.

9. An information push apparatus, comprising: a memory and a processor, the memory storing computer readable instructions, and the processor executing the computer readable instructions stored in the memory stored in the memory to perform:
   obtaining text information sent by a terminal;
   obtaining input process information corresponding to the text information, wherein the input process information is collected during a process that a user of the terminal enters the text information, and comprises at least one of: a response duration, an input duration, and focus switch operation information;
   obtaining first user emotion information corresponding to the input process information, the first user emotion information characterizing an emotion state in the process of inputting the text information by the user, comprising:
      determining whether the first user emotion information exists in pre-stored correspondences between a plurality of user emotion information and a plurality of input process information;
      sending emotion query information to the terminal when the first user emotion information does not exist in the pre-stored correspondences; and
      receiving current emotion information sent by the terminal to be used as the first user emotion information, wherein the current emotion information is input by the user based on the emotion query information;
   generating push information according to the text information and the first user emotion information; and
   sending the push information to the terminal.

10. The apparatus according to claim 9, wherein the text information is input in an interface of a terminal application by the user, and sent to the server upon detection of a sending instruction being selected;
   the response duration is duration from a moment at which interface of the terminal application is entered to a moment at which the text input box is selected;
   the input duration is duration from a moment at which the user clicks the text input box to a moment at which the sending instruction is selected; and
   the focus switch operation information comprises at least one of a quantity of times of focus switches, a focus switch type, or a focus switch time interval.

11. The apparatus according to claim 10, wherein the quantity of times of focus switches is a quantity of times that the text input box loses focus;
   the focus switch type comprises at least one of: performing a switch operation between a plurality of interfaces of the terminal application, running the terminal application at background, or selecting push content in the interface of the terminal application; and
   the focus switch time interval is a time interval between two consecutive focus switch operations.

12. The apparatus according to claim 9, wherein the processor further executes the computer readable instructions to perform:
   pre-storing a correspondence between the input process information and the first user emotion information; and
   obtaining the first user emotion information corresponding to the input process information according to the correspondence.

13. The apparatus according to claim 12, wherein the processor further executes the computer readable instructions to perform:
   determining the emotion state represented by the first user emotion information as a first emotion state if a sum of the response duration and the input duration is greater than or equal to a first preset value, and the focus switch operation information indicates that a focus switch operation exists; and
   determining the emotion state represented by the first user emotion information as a second emotion state if a sum of the response duration and the input duration is less than a second preset value, and the focus switch operation information indicates that no focus switch operation exists.

14. The apparatus according to claim 13, wherein the processor further executes the computer readable instructions to perform:
   associating the correspondence with a user identity;
   obtaining the user identity; and
   obtaining the correspondence according to the user identity, and obtaining the first user emotion information corresponding to the input process information according to the correspondence.

15. The apparatus according to claim 9, wherein the processor further executes the computer readable instructions to perform:
   receiving application page state information sent by the terminal; and
   generating the input process information according to the application page state information;
   the text information comprises second user emotion information, and the processor further executes the computer readable instructions to perform: generating the push information based on a preset processing rule according to the text information, the first user emotion information, and the second user emotion information, wherein in the preset processing rule, a weight value of the second user emotion information is set to be greater than a weight value of the first user emotion information.

16. A non-transitory computer readable storage medium, storing computer readable instructions that, when being executed by at least one processor, cause the at least one processor to perform:
   obtaining text information sent by a terminal;
   obtaining input process information corresponding to the text information, the input process information comprising at least one of: a response duration, an input duration, and focus switch operation information associated with a process that a user of the terminal enters the text information;
   obtaining first user emotion information corresponding to the input process information, the first user emotion information characterizing an emotion state in the process of inputting the text information by the user, comprising:
      determining whether the first user emotion information exists in pre-stored correspondences between a plurality of user emotion information and a plurality of input process information;
      sending emotion query information to the terminal when the first user emotion information does not exist in the pre-stored correspondences; and
      receiving current emotion information sent by the terminal to be used as the first user emotion information, wherein the current emotion information is input by the user based on the emotion query information;

generating push information according to the text information and the first user emotion information; and sending the push information to the terminal.

17. The storage medium according to claim 16, wherein the text information is input in a text input box in an interface of a terminal application by the user, and sent to the server upon detection of a sending instruction being selected;

the response duration is duration from a moment at which the interface of the terminal application is entered to a moment at which the text input box is selected;

the input duration is duration from a moment at which the user clicks the text input box to a moment at which the sending instruction is selected; and the focus switch operation information comprises at least one of a quantity of times of focus switches, a focus switch type, or a focus switch time interval.

18. The storage medium according to claim 17, wherein:

the quantity of times of focus switches is a quantity of times that the text input box loses focus;

the focus switch type comprises at least one of: performing a switch operation between a plurality of interfaces of the terminal application, running the terminal application at background, or selecting push content in the interface of the terminal application; and the focus switch time interval is a time interval between two consecutive focus switch operations.

19. The storage medium according to claim 16, wherein:

the computer readable instructions further cause the at least one processor to perform: pre-storing a correspondence between the input process information and the first user emotion information; and the obtaining first user emotion information corresponding to the input process information comprises: obtaining the first user emotion information corresponding to the input process information according to the correspondence.

20. The storage medium according to claim 19, wherein the obtaining the first user emotion information corresponding to the input process information according to the correspondence comprises:

determining the emotion state represented by the first user emotion information as a first emotion state if a sum of the response duration and the input duration is greater than or equal to a first preset value, and the focus switch operation information indicates that a focus switch operation exists; and determining the emotion state represented by the first user emotion information as a second emotion state if a sum of the response duration and the input duration is less than a second preset value, and the focus switch operation information indicates that no focus switch operation exists.

* * * * *